United States Patent
Johnson et al.

(10) Patent No.: US 9,323,996 B2
(45) Date of Patent: Apr. 26, 2016

(54) CONTROLLING MULTIPLE PHOTOGRAPHIC ADJUSTMENTS WITH A SINGLE CONTROL

(71) Applicant: Apple Inc., Cupertino, CA (US)

(72) Inventors: Garrett M. Johnson, San Francisco, CA (US); Russell Y. Webb, San Jose, CA (US); Russell Reid, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 30 days.

(21) Appl. No.: 14/292,921

(22) Filed: Jun. 1, 2014

(65) Prior Publication Data

US 2015/0347858 A1    Dec. 3, 2015

(51) Int. Cl.
| | |
|---|---|
| G06K 9/03 | (2006.01) |
| G06T 5/00 | (2006.01) |
| G06T 11/60 | (2006.01) |
| G06F 3/0484 | (2013.01) |

(52) U.S. Cl.
CPC ............ *G06K 9/033* (2013.01); *G06F 3/04847* (2013.01); *G06T 5/00* (2013.01); *G06T 11/60* (2013.01)

(58) Field of Classification Search
USPC ......... 382/309, 310, 311, 174, 229, 289, 177; 345/173, 177; 178/18.04, 19.02, 18.01; 348/222.1, 218.1, 231.99; 358/448, 358/451, 1.9; 386/278, 282; 715/748, 764, 715/765, 770, 201, 202, 255
See application file for complete search history.

(56) References Cited

U.S. PATENT DOCUMENTS

| | | | | |
|---|---|---|---|---|
| 5,436,734 A | * | 7/1995 | Yamauchi | H04N 1/40 358/1.9 |
| 8,296,671 B2 | * | 10/2012 | Narayanan | G06F 9/543 715/764 |
| 8,682,142 B1 | * | 3/2014 | Boskovitz | G11B 27/034 386/278 |
| 8,971,617 B2 | | 3/2015 | Ubillos et al. | |
| 9,013,593 B2 | * | 4/2015 | Ichikawa | H04N 19/60 348/218.1 |
| 2006/0066628 A1 | | 3/2006 | Brodie et al. | |
| 2011/0145743 A1 | | 6/2011 | Brinkmann et al. | |

FOREIGN PATENT DOCUMENTS

WO  PCT/US2015/027662    4/2015

OTHER PUBLICATIONS

International Search and Written Opinion of PCT/US2015/027662, Jul. 29, 2015 (mailing date), Apple Inc.
Author, Unknown, "Adobe Photoshop 6.0 : User Guide; Photoshop Basics, Chapter 2: Getting Images into Photoshop and ImageReady" Month Unknown, 2000, 46 pages, Adobe Systems Incorporated, available at http://kfrserver.natur.cuni.cz/obecne/soubory/PhotoShop6/UserGuide.pdf.

* cited by examiner

*Primary Examiner* — Anh Do
(74) *Attorney, Agent, or Firm* — Adeli LLP

(57) ABSTRACT

A method and system for controlling multiple image editing controls using one master control. The system identifies various characteristics of an image being edited. The system generates, for each of multiple image editing controls, a relationship between the master control and the image editing control. The relationship is based on at least one of the identified characteristics of the image being edited. The relationship is different for different images when the different images have different characteristics, such as different average color component values at a particular percentile of pixels in the images.

22 Claims, 13 Drawing Sheets

CONTROLLING MULTIPLE PHOTOGRAPHIC ADJUSTMENTS WITH A SINGLE CONTROL

BACKGROUND

In image editing applications, multiple controls are provided that have overlapping effects. Changing a shadows setting will affect contrast, changing an exposure setting will affect brightness, etc. The overlapping effects of the many controls can result in a frustrating exercise of adjusting one control, then adjusting another control, and then having to readjust the first control to compensate for changes due to the second control's adjustment. Some image editing applications provide master controls that are rigged to multiple image editing controls. When image editing controls are rigged to a master control, adjusting a value of the master control adjusts the values of the individual editing controls according to a relationship (e.g., a mathematical formula) relating values of the master control to values of the other image editing controls. In some applications, each image editing control has a separate relationship with the master control. However, the master controls of such applications are of limited use, because, for a given value of the master control, the application applies the same set of values to the image editing controls, regardless of the nature of the image being edited.

BRIEF SUMMARY

Some embodiments provide an application (e.g., an image organizing and editing application) that analyzes an image to be edited and rigs multiple image editing controls to a master control using a set of relationships based on characteristics of the image. In such embodiments, the image editing application sets different relationships between the master control and the image editing controls for different images with different characteristics.

In some embodiments, an image editing application calculates a histogram of gray values of an image based on color component values of the pixels in an image. The image editing application of some embodiments calculates a cumulative histogram. The image editing application then determines statistics based on the gray values and the cumulative histogram. In some embodiments, the image editing application calculates statistics such as the gray values of various percentiles of the pixels of the image (e.g., the $2^{nd}$, $10^{th}$, $25^{th}$, $50^{th}$, $75^{th}$, and $98^{th}$ percentiles of the pixels in the histogram). The image editing application then uses these statistics to calculate a relationship between the master control's value, set by the user, and values for each of the image editing controls rigged to the master control. In some embodiments, the image editing controls include controls for exposure, contrast, highlights, brightness, shadows, and black settings.

After calculating the relationships between the master control values and the image editing control values, the image editing application of some embodiments uses the relationships and a master control value set by a user to determine image editing values to apply to the image.

The image editing application then adjusts the image based on these image editing control values.

In addition to allowing the user to set the master control value, the image editing application of some embodiments provides a control for automatically setting the master control value. When the user activates the control, the image editing application automatically sets the master control to a value that is calculated based on characteristics of the image. In some embodiments, the image editing application calculates this automatic master control value at the time the image is analyzed to calculate the statistics. In other embodiments, the automatic master control value is calculated at a different time (e.g., after the automatic adjustment control is activated).

The image editing application of some embodiments calculates different sets of statistics for each of a plurality of master controls. For example in some embodiments, the image editing application calculates statistics based on gray values (e.g., average color component values) of the image. The image editing application uses these statistics for setting relationships between values of a light based master control and values of light based image editing controls. The image editing application also calculates an automatic master control value for the light based master control image.

In addition to the calculations for the light based controls, the image editing application of some embodiments separately calculates statistics based on color characteristics of the image (e.g., saturation values of the pixels of the image). The image editing application uses these statistics for setting relationships between values of a color based master control and values of color based image editing controls. The image editing application of some embodiments also uses these statistics (and/or other statistics) to determine an automatic master control value for the color based master control.

The image editing application of some embodiments also calculates statistics based on color and/or gray values of an image for setting relationships between values of a black and white master control and values of image editing controls that affect the results of a conversion of a color image to a black and white image. The image editing application of some embodiments also calculates an automatic master control value for the black and white master control. The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

In the following detailed description of the invention, numerous details, examples, and embodiments of the invention are set forth and described. However, it will be clear and apparent to one skilled in the art that the invention is not limited to be identical to the embodiments set forth and that the invention may be practiced without some of the specific details and examples described. It will be clear to one of ordinary skill in the art that various controls depicted in the figures are examples of controls provided for reasons of clarity. Other embodiments may use other controls while remaining within the scope of the present embodiment. For example, a control depicted herein as a hardware control may be provided as a software icon control in some embodiments, or vice versa. Similarly, the embodiments are not limited to using only the various indicators and icons depicted in the figures.

Figure 1:
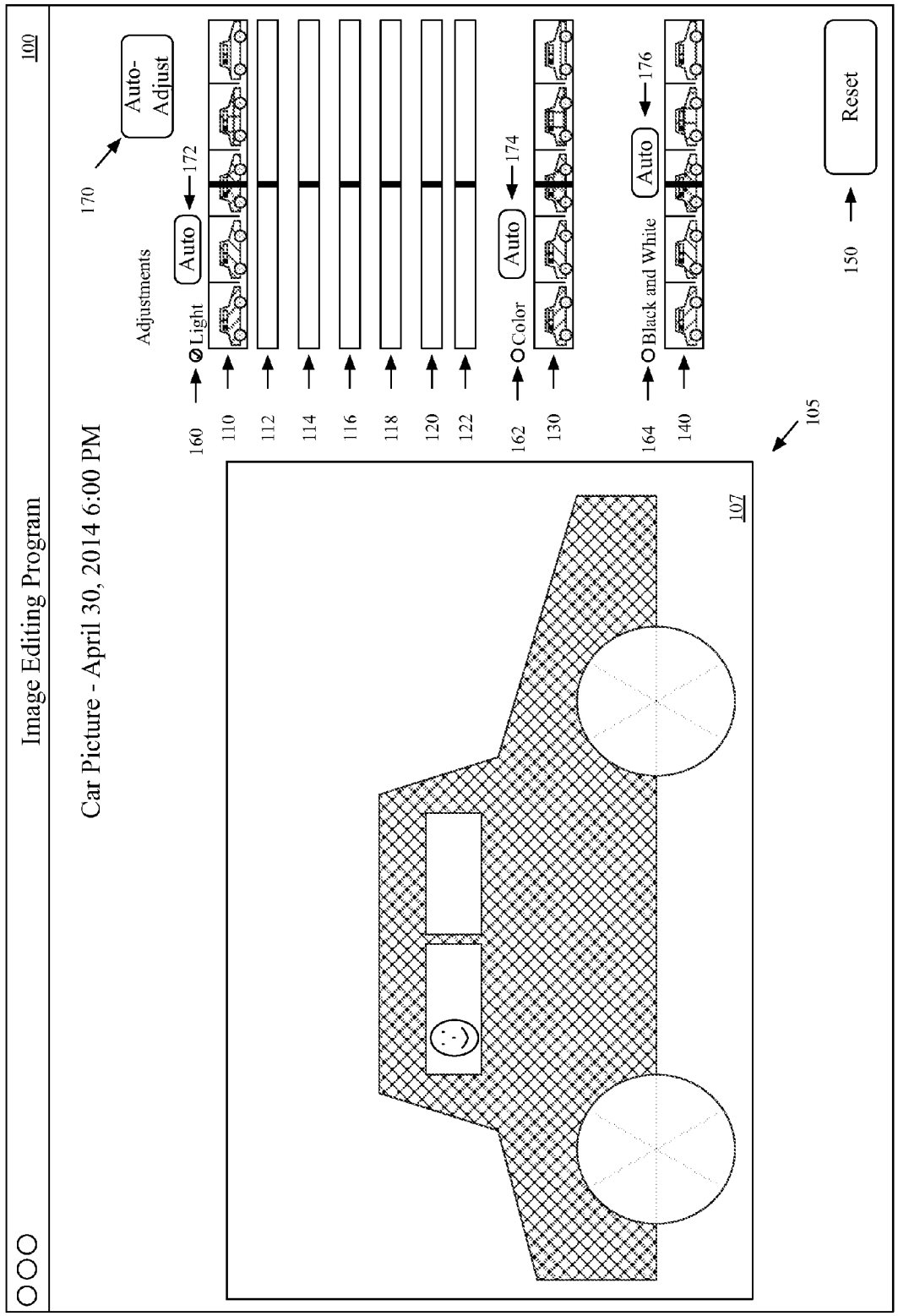
FIG. 1 illustrates an image editing application of some embodiments.

FIG. 1 illustrates an image editing application 100 of some embodiments. The image editing application includes an image display area 105 containing image 107, a master control 110 for adjusting image controls relating to light (e.g., luminance) values of the image, image editing controls 112-122 for editing various aspects of the image, master control 130 for adjusting color related aspects of the image, master control 140 relating to controls that affect the results of a conversion of a color image to a black and white image, reset control 150, master control expanders 160-164, a master auto-adjustment control 170, and individual auto-adjustment controls 172-176. The image editing application 100 of some embodiments is a program executed by at least one processing unit of a computer or other machine (e.g., a smart phone or tablet computing device). In some embodiments, the image editing application 100 edits still images (e.g., photographs), video images, and/or slide shows. In some embodiments the image editing application 100 also provides image organizing features. The image editing application 100 displays an image 107 in the image display area 105. Image 107 is the image currently being edited by the application 100. As image 107 is the image currently being edited, adjustments to the values of the controls 110-150 are applied to image 107.

Image editing controls 112-122 are adjustable by a user of the application. Adjusting one of the controls 112-122 changes a value of a setting that is controlled by that control. Changing the value of the setting causes the image editing application 100 to adjust aspects of the image controlled by that setting. In addition to allowing a user to control the value of a setting, the controls 112-122 of some embodiments also indicate a present value of the setting (e.g., for a slider control, the setting can be indicated by the position of a control knob, represented in the figures as a line on the slider, by selectively coloring the slider, by displaying a numerical value of the setting on or near the slider, etc.). In some embodiments, a specific selection action (e.g., double-clicking, double-tapping if using a touchscreen, etc.) causes the control to reset (i.e., to the middle, non-adjusted setting, or the value for the individual control determined by the master control setting). In addition, in some embodiments, placing a location indicator (e.g., cursor) over one of the controls enables the user to directly edit a numerical value associated with the control, an action equivalent to moving the control to the position associated with the numerical value.

Master control 110 is used to control multiple aspects of the image relating to luminance. When a user adjusts the master control 110, the image editing application 100 automatically (i.e., without user interference other than adjusting the master control) adjusts multiple image editing controls (i.e., some or all of image editing controls 112-122). In addition to automatically adjusting the image editing controls, the application 100 also adjusts the values represented by the automatically adjusted image editing controls. Examples of changes to the settings are further described with respect to FIG. 2, below. In some embodiments, image editing controls 112-122 can also be individually adjusted. Some embodiments enable the user to perform a particular selection action (e.g., double-clicking, double-tapping if using a touchscreen, etc.) that causes the master control 110 to reset to a non-adjusted (e.g., middle) position, while preserving the adjustments of any individual controls that have been directly adjusted by the user. Other embodiments reset all controls under the master control 110 including those that were individually adjusted. Still other embodiments reset the master control to the automatic adjustment value calculated based on the image statistics, which is described below. In some embodiments, the application 100 sets up different relationships between the master control 110 and each of the image editing controls 112-122. The relationship between the master control 110 and a particular image editing control is determined by a characteristic of the image being edited in some embodiments. For example, a particular value of the master control 110 relates to different values for control 112 when editing different images. In some embodiments, the relationship between the master control 110 and a particular image editing control (e.g., image editing control 112) depends on a characteristic that varies from image to image (e.g., average luminance value of the images, distribution of gray values of the image, etc.).

Some embodiments provide multiple master controls. The illustrated embodiment provides master control 130 for adjusting image editing controls for color related aspects of the image (e.g., a saturation control, a color contrast control, and a color cast control, which are not shown). The illustrated embodiment also provides master control 140 for adjusting image editing controls that affect the results of a conversion of a color image into a black and white image. For example, the image editing application of some embodiments provides a hue angle control. The setting of the hue angle control affects how bright a pixel in the black and white version of the image will appear, based on the color of the corresponding pixel in the current image (e.g., green pixels in the color image will convert to bright pixels in the black and white image for a first setting of the hue angle and the same pixels will convert to dark pixels in the black and white image for a second setting of the hue angle control). The hue angle and/or other controls relating to black and white conversion are rigged to master control 140 in some embodiments. In some embodiments, the image editing controls related to a particular master control can optionally be hidden or displayed. In FIG. 1, master control expanders 160-164 determine which image editing controls are visible. In this figure, the master control expander 160 is activated; therefore the image editing application 100 displays the image editing controls 112-122 rigged to master control 110. The master control expanders 162 and 164 are not activated; therefore the image editing application 100 does not display the image editing controls rigged to master controls 130 and 140. In some embodiments, reset control 150, when activated, causes any edits to the image to be undone, and the image to return to its original state.

In addition to, or instead of one or more of, the master controls 110, 130, and 140 with relationships to image editing controls that are determined based on characteristics of the image being edited, some embodiments provide an auto-adjustment control 170. In some embodiments, when a user activates the auto-adjustment control 170, the image editing application automatically sets one or more of the master control values to pre-calculated values that are based on characteristics of the image. The image editing application then sets the image editing controls that are rigged to the master controls to values dependent on their respective relationships. In some embodiments, a separate pre-calculated value is determined for each of the master controls once the statistics of the image are determined. In some embodiments, activating the auto-adjustment control 170 also automatically sets values for controls that are not rigged to master controls (e.g., a white balance control not rigged to a master control). The image editing applications of some embodiments selectively apply the automatic adjustments. For example, in some embodiments, upon activation of the auto-adjust control 170 the image editing control will automatically adjust the light based master control 110 and the color based master control 130, but will not automatically adjust the black and white master control unless the image is being converted to black and white. The image editing application omits adjusting the black and white master control under that circumstance because the black and white controls only affect an image that is being converted into black and white. In addition, the automatic value calculated for the auto-adjustment control 170 may be used in some embodiments to calculate the setting value for one or more controls rigged to a master control (i.e., the setting value for an individual control may be a function of both the master control setting and the automatically calculated value for the auto-adjustment control.

In addition to the auto-adjustment control 170, which automatically sets the light and color master controls (and, in some cases, the black and white master control), some embodiments include individual auto-adjustment controls 172-176. These controls enable the user to automatically set one of the master controls without affecting the other controls. For instance, selection of the light auto-adjustment control 172 automatically sets the light master control (and in turn the individual light controls) but does not affect either the black and white controls or the color controls.

I. Master Control

Figure 2:
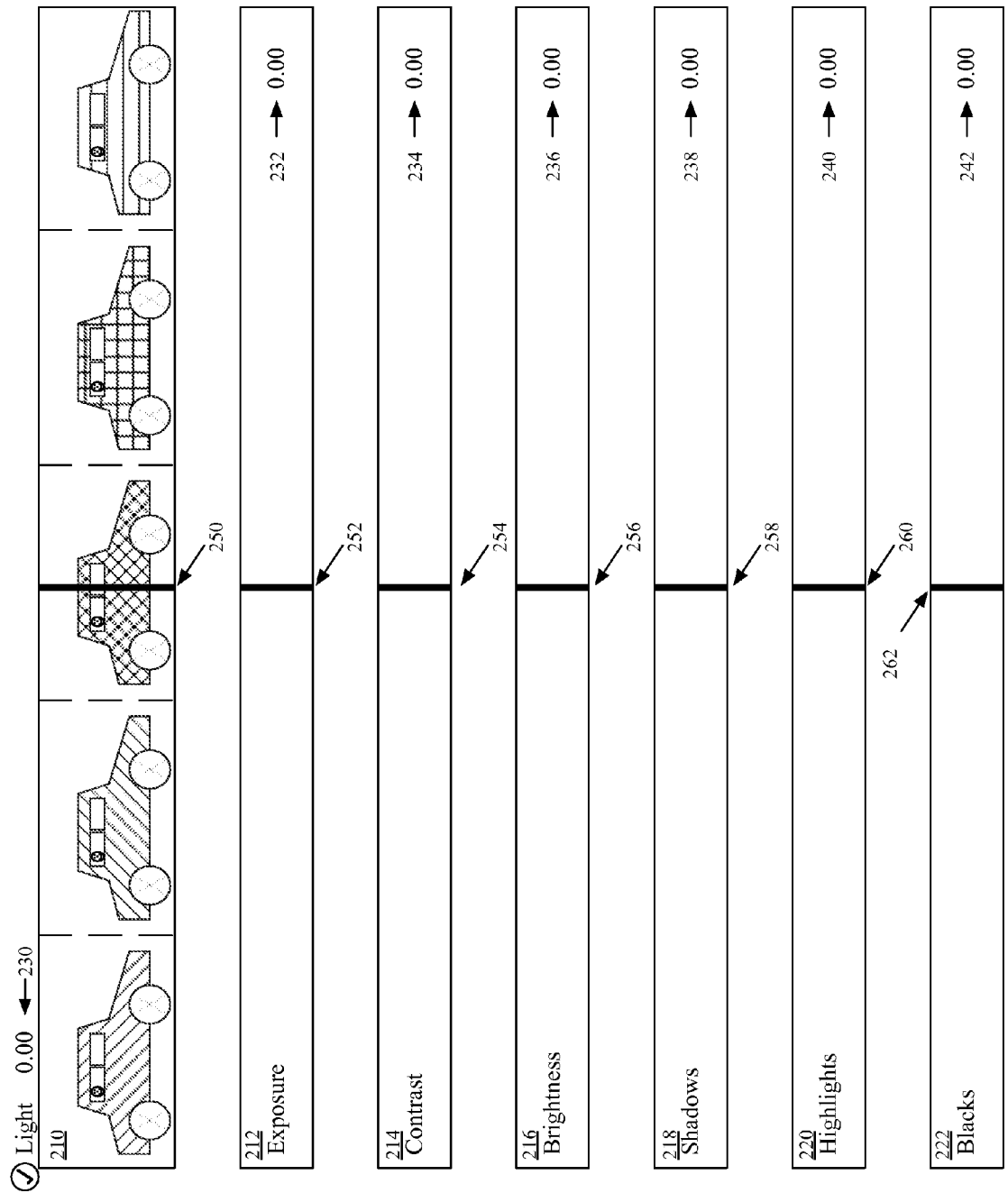
FIG. 2 illustrates a master control in a neutral setting and multiple image editing controls rigged to the master control.

FIG. 2 illustrates a master control in a neutral setting and multiple image editing controls rigged to the master control. The figure includes master control 210, exposure control 212, contrast control 214, brightness control 216, shadows control 218, highlights control 220, black control 222, master control value indicator 230, exposure indicator 232, contrast indicator 234, brightness indicator 236, shadows indicator 238, highlights indicator 240, black indicator 242, and control knobs 250-262.

In this figure, master control 210 includes multiple thumbnail images that provide an approximation of what the image being edited will look like under various settings. For example, when the control knob 250 is set to values on the right side of the master control 210, the image will look light, so the thumbnail on that side is light. In contrast, when the control knob 250 is set to values on the left side of the master control 210, the image will look dark, so the thumbnail on that side is dark.

In this figure, master control 210 is set to a central setting (the control knob 250 is in the middle). In some embodiments, the center of the master control is a neutral setting. In some embodiments, a neutral setting of the master control 210 results in a neutral setting of each of the image editing controls 212-222 rigged to the master control 210. In some embodiments, a neutral value of an image editing control results in that control making no changes to an image. As all the luminance related image editing controls 212-222 are set to neutral values, the image editing application does not change any of the luminance related aspects of the image. The values associated with each control are indicated by the indicators 230-242 and control knobs 250-262.

In the illustrated embodiment, the neutral settings of the master control 210 and image editing controls 212-222 each correspond to a value of 0.00, as indicated by indicators 230-242 which all read 0.00 and control knobs 250-262, which are centered on their respective controls. The neutral setting of the master control 210 corresponds to a neutral setting for each of the image editing controls 212-222 in the embodiments shown herein. However, in alternate embodiments, the neutral setting of a master control corresponds to a non-neutral setting of one or more image editing controls. For example, in some embodiments, a neutral setting of the master control corresponds to a positive or negative setting of the exposure control.

The master control 210 and image editing controls 212-222 are all represented as sliders. That is, controls which are adjusted by a user sliding a graphical user interface (GUI) element, such as the control knobs 250-262. In some embodiments, the GUI receives commands to slide a control knob by a user clicking and dragging the control knob with a cursor control device. In some embodiments, instead of or in addition to receiving commands from a cursor control device, the GUI receives commands to slide a control knob from a gestural command on a touch sensitive display screen (e.g., a finger making contact with the display screen at the location of the control knob, sliding along the display screen, and dragging the control knob with it). Similarly, in addition to or instead of such interfaces, some embodiments allow a user to select and move a control knob by using a keyboard (e.g., tabbing to select a particular control knob and using arrow keys to move the selected control knob to increase or decrease the value of the control). Although the illustrated master controls and image editing controls (other than the reset and auto-adjust controls) are all sliders, in other embodiments, other types of controls are provided for one or more image editing settings. For example, in some embodiments, one or more controls are dials, multi-axis multi-setting interfaces (e.g., a grid with exposure values along one axis and contrast values along another axis, with each point on the grid representing a value for both exposure and contrast settings), a numerical control (e.g., values can be typed into a text entry box), and/or other GUI control mechanisms.

In the illustrated examples herein, all of the controls 212-222 are rigged to the master control. However, in other embodiments, one or more controls displayed under a master control is not rigged to the master control. In some such embodiments, activating a master control expander (e.g., master control expander 162 of FIG. 1) will reveal (or hide) one or more controls that are rigged to a master control and one or more controls that are not rigged to the master control (see, e.g., the description of FIGS. 10 and 11). Therefore, although the controls 212-222 are shown in the figures herein as rigged to the master control 210, in alternate embodiments, one or more of the controls 212-222 may not be rigged to the master control 210. In such embodiments, adjustments to the value of master control 210 will result in changes to the controls rigged to the master control 210, but no changes to a control that is not rigged to master control 210.

Figure 3:
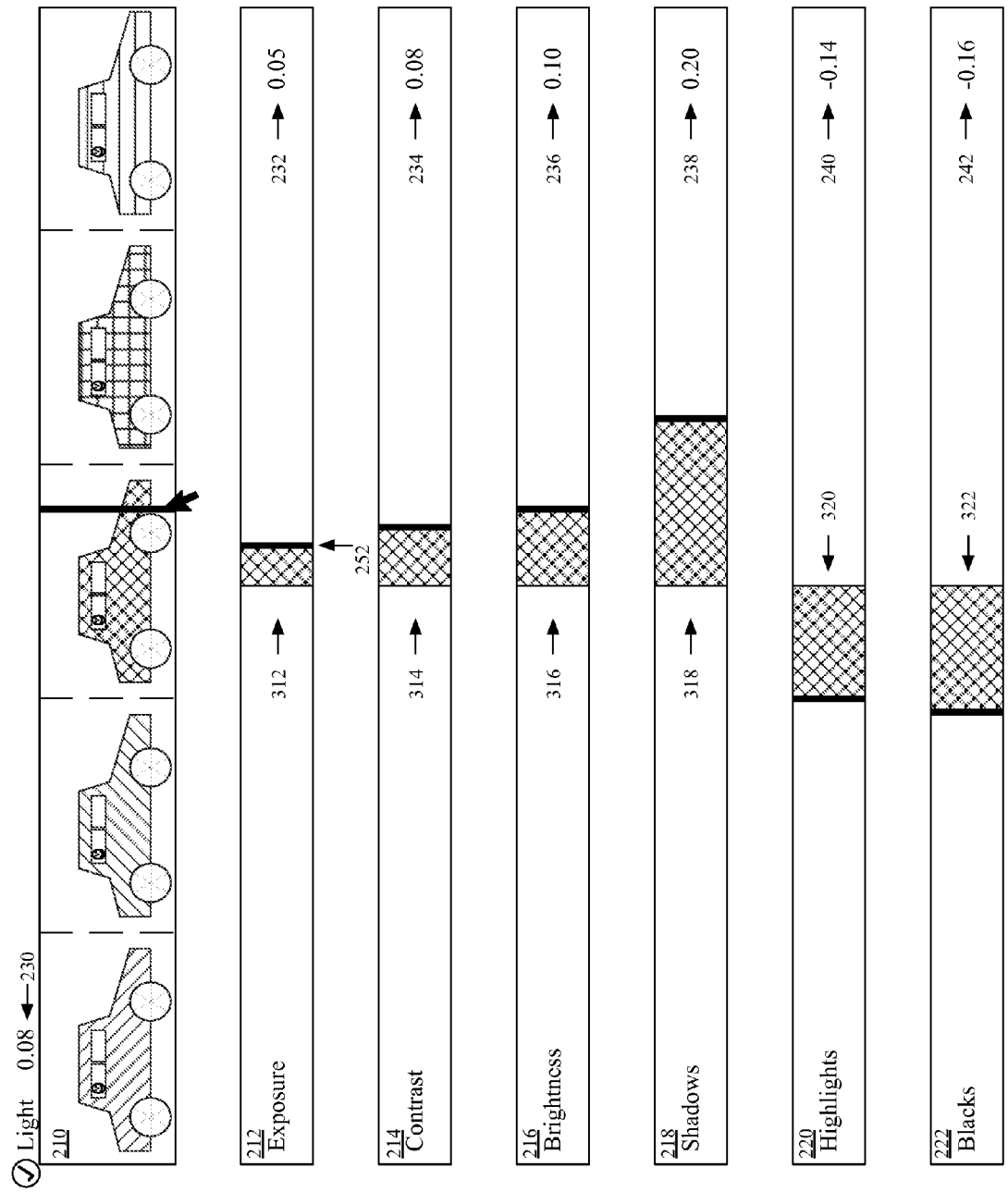
FIG. 3 illustrates a master control at a low, positive setting and multiple image editing controls rigged to the master control.

FIG. 3 illustrates a master control at a low, positive setting and multiple image editing controls rigged to the master control. The figure shows the changes to the image editing controls 212-222 in response to changing the value of the master control 210 by a small, positive amount. The figure includes stripes 312-322. Stripe 312 provides a visual indicator of the value of the exposure setting. Stripe 314 provides a visual indicator of the value of the contrast setting. Stripe 316 provides a visual indicator of the value of the brightness setting. Stripe 318 provides a visual indicator of the value of the shadows setting. Stripe 320 provides a visual indicator of the value of the highlights setting. Stripe 322 provides a visual indicator of the value of the black setting. In some embodiments, each stripe extends from the center of the image editing control (e.g., an image editing slider) to the control knob of that image editing control. For example, stripe 312 extends from the center of the exposure control to the control knob 252.

In some embodiments, the length of each stripe from the center of the corresponding image control slider and the distance of the control knob from the center of the corresponding image editing control slider are proportional to the value of the setting. In the figures illustrated herein, the lengths and distances may not be to scale within a given figure or across figures.

In addition to the stripes 312-322 and the control knobs 252-262, the indicators 232-242 display numbers that indicate the value of the corresponding setting. For example, indicator 232 displays a number (here, 0.05) that indicates that the exposure setting of exposure control 212 has a value of 0.05 in this figure. Similarly, indicator 230 displays a number (here, 0.08) that indicates that the master control setting of master control 210 has a value of 0.08 in this figure.

Several features of the rigging of values of the image editing settings to the master control are displayed in this figure. The figure illustrates that different image editing controls 212-222 can have different relationships with the master control 210. Here, the relationship between master control 210 and image editing control 212 results in the value of the image editing control 212 being automatically set to 0.05 when the value of the master control 210 is set to 0.08. In contrast, the relationship between the master control 210 and image editing control 214 results in the value of image editing control 214 being automatically set to 0.08 when the value of the master control 210 is set to 0.08. Additionally, the figure demonstrates that in some embodiments, the relationship between master control 210 and the image editing controls 212-222 can result in a setting for an image editing control that is greater that the setting of the master control 210 (e.g., brightness setting 216 being set to 0.10), a setting for an image editing control that is less than the setting of the master control 210 (e.g., exposure setting 212 being set to 0.05), or a setting for an image editing control that is equal to the setting of the master control 210 (e.g., contrast setting 214 being set to 0.08). In addition to demonstrating that the relationships between master control 210 and image editing controls 212-222 can vary, the figure also illustrates that the relationship can be a negative relationship in some embodiments. That is, a positive value of the master control 210 can result in a negative value of one or more of the image editing controls 212-222. Here, the value of the master control 210 is a positive number (0.08) while the value of the highlights control 220 is a negative number (−0.14). As mentioned with respect to FIG. 2, in some embodiments, one or more controls grouped under a master control are not rigged to the master control. In such embodiments, the value of such a control would remain at the value it had been before the master control value was changed (e.g., 0.00 if the control had been at 0.00 before the master control value was changed).

Figure 4:
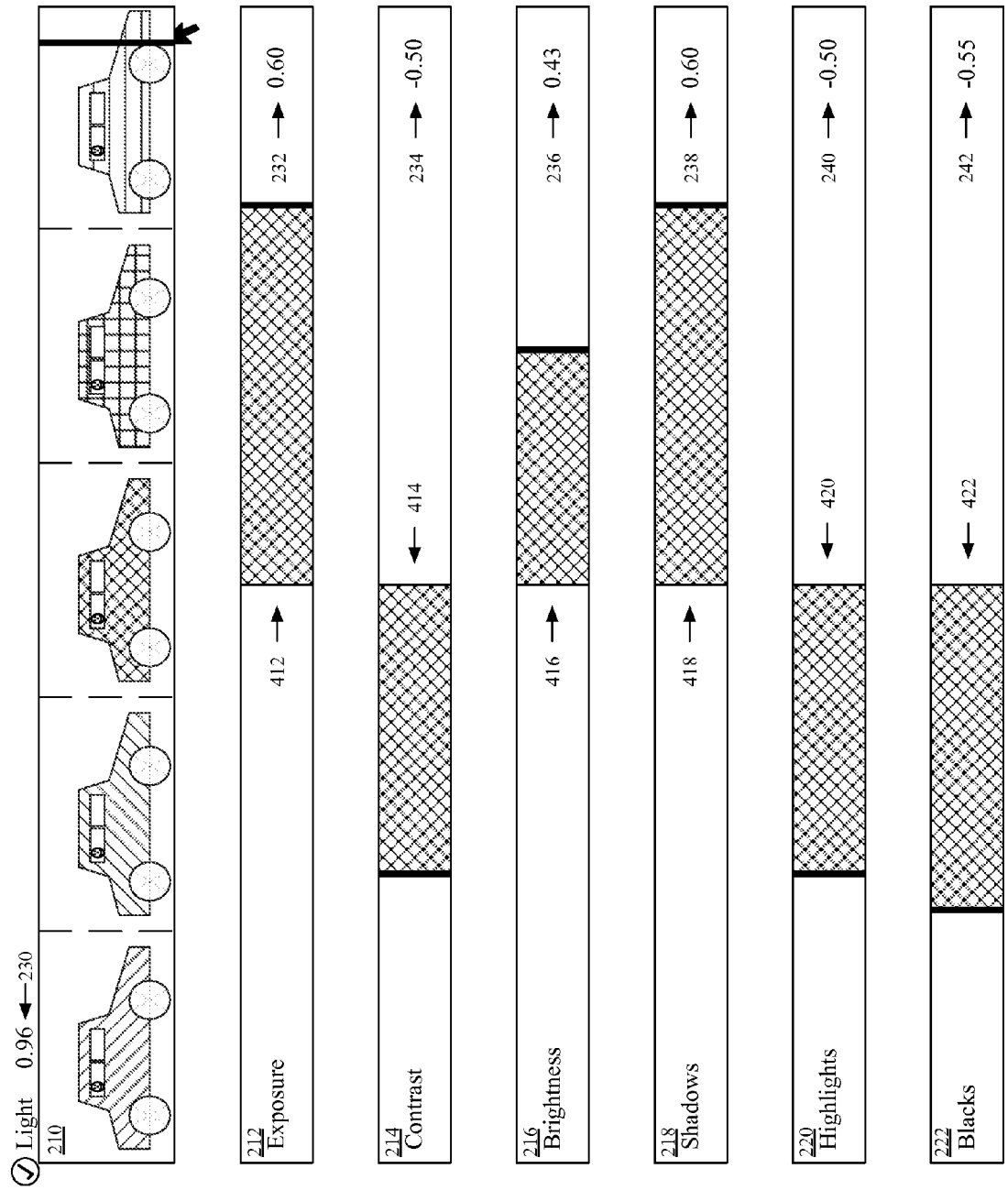
FIG. 4 illustrates a master control at a high, positive setting and multiple image editing controls rigged to the master control.

FIG. 4 illustrates a master control at a high, positive setting and multiple image editing controls rigged to the master control. The figure shows the changes to the image editing controls 212-222 in response to changing the value of the master control 210 by a large, positive amount. The figure includes stripes 412-422. Stripe 412 provides a visual indicator of the value of the exposure setting. Stripe 414 provides a visual indicator of the value of the contrast setting. Stripe 416 provides a visual indicator of the value of the brightness setting. Stripe 418 provides a visual indicator of the value of the shadows setting. Stripe 420 provides a visual indicator of the value of the highlights setting. Stripe 422 provides a visual indicator of the value of the black setting. As in FIG. 3, each stripe extends from the center of the image editing control (e.g., an image editing slider) to the control knob of that image editing control. Furthermore, the lengths of the stripes and distances of the control knobs 250-262 from the centers of their respective controls 210-222 may not be to scale within a given figure or across figures.

In addition to the stripes 412-422 and the control knobs 252-262, the indicators 232-242 display numbers that indicate the value of the corresponding setting. For example, indicator 232 displays a number (here, 0.60) that indicates that the exposure setting of exposure control 212 has a value of 0.60 in this figure. Similarly, indicator 230 displays a number (here, 0.96) that indicates that the master control setting of master control 210 has a value of 0.96 in this figure.

In some embodiments, one or more of the image editing controls 212-222 may have a linear relationship with the master control 210. That is, a change in the value of the master control 210 will cause a change in the value of that image editing control that is directly proportional to the amount of change in the value of the master control 210. For example, an increase in the value of the master control 210 of 0.08 from FIG. 2 (0.00, as indicated by indicator 230) to FIG. 3 (0.08, as indicated by indicator 230) results in an increase of the exposure value of 0.05 from FIG. 2 (0.00, as indicated by indicator 232) to FIG. 3 (0.05, as indicated by indicator 232). The increase in the exposure value from FIG. 2 to FIG. 3 is therefore ⅝ of the increase in the master control 210 value. The increase in the value of the master control 210 of 0.88 from FIG. 3 (0.08, as indicated by indicator 230) to FIG. 4 (0.96, as indicated by indicator 230) results in an increase of the exposure value of 0.55 from FIG. 3 (0.05, as indicated by indicator 232) to FIG. 4 (0.60, as indicated by indicator 232). The increase in the exposure value from FIG. 3 to FIG. 4 is therefore ⅝ of the increase in the master control 210 value. The ratio of the increases is the same from FIG. 2 to FIG. 3 as from FIG. 3 to FIG. 4 because the relationship between the master control 210 and the image editing control 212 is linear.

Although the relationship between the master control 210 and the image editing control 212 is linear, the relationship between the master control 210 and other image editing controls 214-240 is not linear. For example, when the master control 210 has a value of 0.08 (in FIG. 3), the contrast value is also 0.08. However, in FIG. 4, the value of the master control 210 has increased, while the value of the contrast has actually decreased to a value below zero. In addition to the relationship not being linear, the contrast value is greater at an intermediate master control 210 value (e.g., master control 210 value 0.08, contrast value 0.08) than the contrast value is at either a low master control 210 value (e.g., master control 210 value 0.00, contrast value 0.00) or a high master control 210 value (e.g., master control 210 value 0.96, contrast value −0.50). Such a relationship demonstrates that in some embodiments, under some circumstances, an image editing control value has a peak value (is maximized) at an intermediate master control 210 value rather than at an extreme master control 210 value. Similarly, in some embodiments, in some circumstances, an image editing control value has a trough value (is minimized) at an intermediate master control 210 value rather than at an extreme master control 210 value.

FIGS. 3-4 illustrate changes to the values of various image editing control settings in response to changes to the value of the master control. However, the particular relationships between the master control values in those figures and the image editing control values in those figures is specific to images with the characteristics of image 107. When the image editing application of some embodiments is editing a different image, with different characteristics, the relationships between the master control values and the image editing controls' values are different. Therefore the image editing application will provide different image editing control values for a particular value of the master control, when the image editing application is editing different images.

Figure 5:
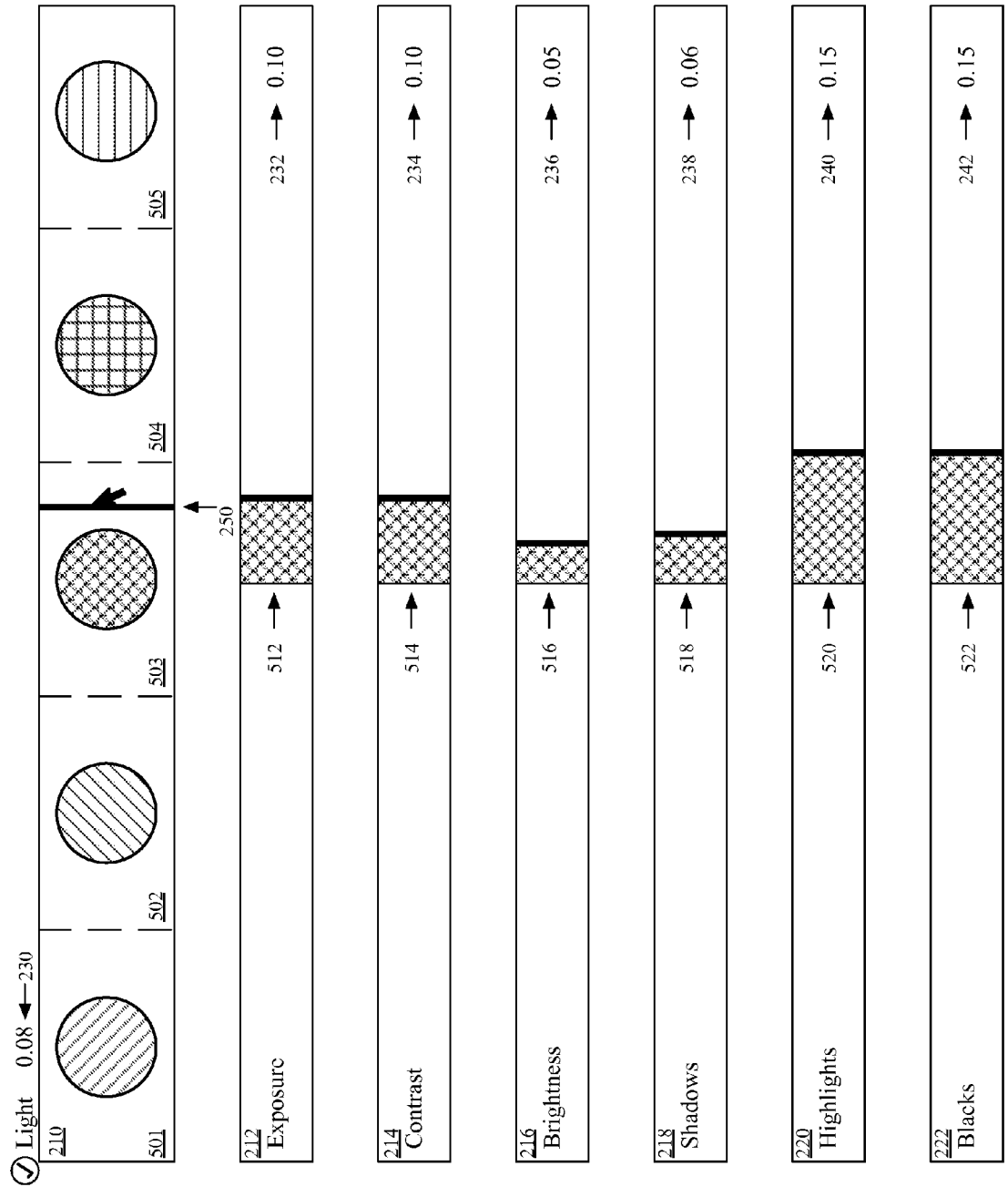
FIG. 5 illustrates a master control at a low, positive setting and multiple image editing controls rigged to the master control where the rigging is based on an alternate image.

FIG. 5 illustrates a master control at a low, positive setting and multiple image editing controls rigged to the master control where the rigging is based on an alternate image. The image includes thumbnails 501-505. The figure also includes stripes 512-522.

In FIGS. 2-4, the master control 210 included multiple thumbnail images of image 107 from FIG. 1 (a photograph of a car). The thumbnails provide an approximation of what the image 107 would look like under various settings of the master control 210. Here, the thumbnails of image 107 have been replaced by thumbnails 501-505 of a different image. The central thumbnail 503 represents what the unedited image looks like, while the additional thumbnails 501, 502, 504, and 505 each represent approximately what the image would look like if the master control 210 were set to a value within that thumbnail's portion of the master control 210. For example, when the control knob 250 is set to values on the right side of the master control 210, the image will look light, so the thumbnail 505 on that side is light. In contrast, when the control knob 250 is set to values on the left side of the master control 210, the image will look dark, so the thumbnail 501 on that side is dark.

The stripes 512-522 provide visual indicators of the values of the image controls 212-222. Stripe 512 provides a visual indicator of the value of the exposure setting. Stripe 514 provides a visual indicator of the value of the contrast setting. Stripe 516 provides a visual indicator of the value of the brightness setting. Stripe 518 provides a visual indicator of the value of the shadows setting. Stripe 520 provides a visual indicator of the value of the highlights setting. Stripe 522 provides a visual indicator of the value of the black setting. In some embodiments, each stripe extends from the center of the image editing control (e.g., an image editing slider) to the control knob of that image editing control. For example, stripe 512 extends from the center of the exposure control to the control knob 252.

Some embodiments rig the image editing controls 212-222 with different relationships, when editing different images, based on different characteristics of the images being edited. The master control 210 value in FIG. 5 is the same as the master control 210 value in FIG. 3. However, the image being edited in FIG. 5 has different characteristics than the image being edited in FIG. 3. Therefore the image editing controls 212-222 have different values in FIG. 5 than in FIG. 3.

In addition to the stripes 512-522 and the control knobs 252-262, the indicators 232-242 display numbers that indicate the value of the corresponding setting. For example, indicator 232 displays a number (here, 0.10) that indicates that the exposure setting of exposure control 212 has a value of 0.10 in this figure. Similarly, indicator 230 displays a number (here, 0.08) that indicates that the master control setting of master control 210 has a value of 0.08 in this figure. Because the characteristics (e.g., average gray value, gray value at a given percentile of the pixels, etc.) of the image represented by thumbnails 501-505 are different from the corresponding characteristics of image 107, the values of the image editing controls 212-222 in FIG. 5 are different from the corresponding values in FIG. 3, even though the master control 210 value is the same in both figures (i.e., 0.08 in both FIGS. 3 and 5).

Figure 6:
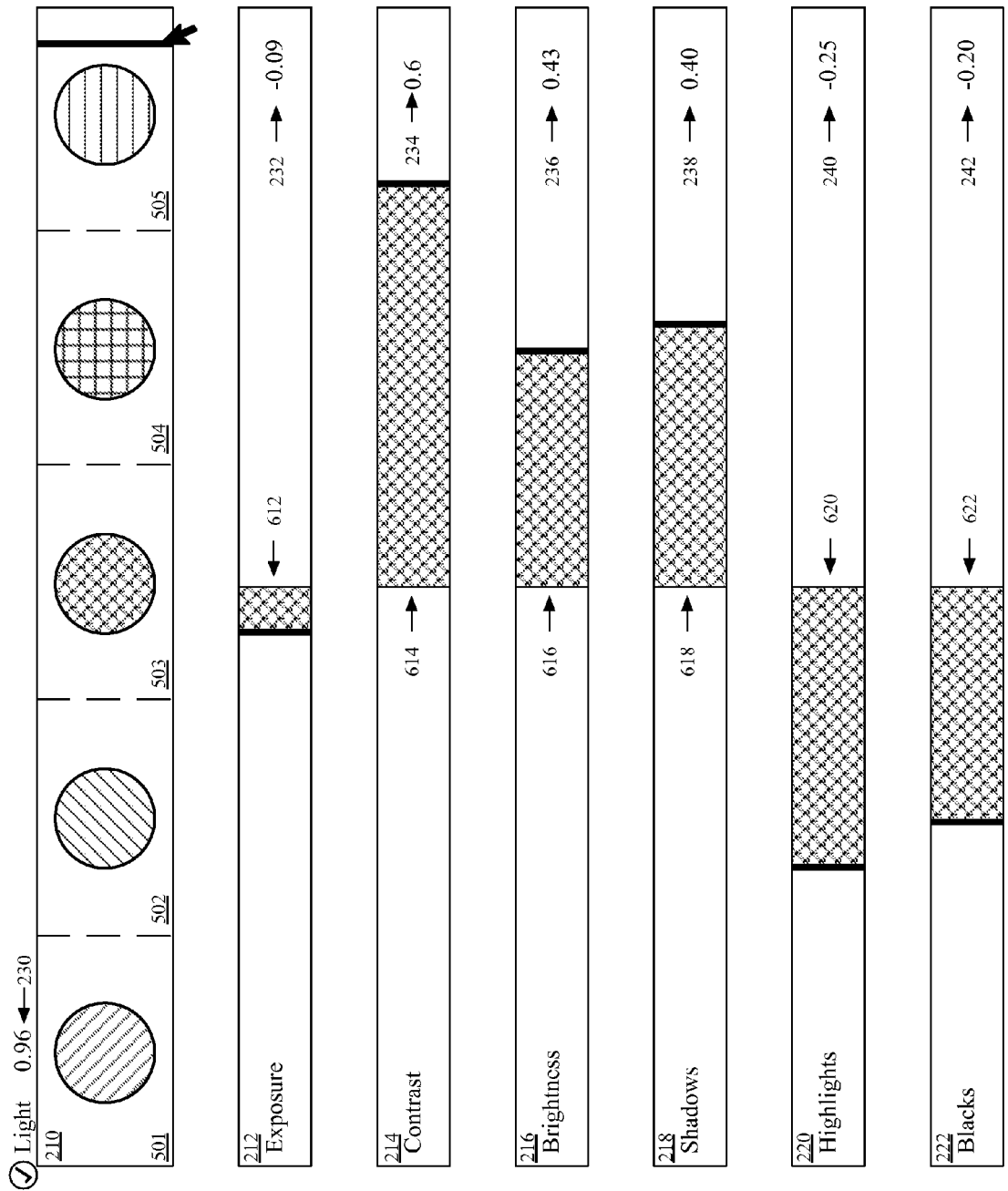
FIG. 6 illustrates a master control at a high, positive setting and multiple image editing controls rigged to the master control where the rigging is based on an alternate image.

FIG. 6 illustrates a master control at a high, positive setting and multiple image editing controls rigged to the master control where the rigging is based on an alternate image. The image includes stripes 612-622. Stripe 612 provides a visual indicator of the value of the exposure setting. Stripe 614 provides a visual indicator of the value of the contrast setting. Stripe 616 provides a visual indicator of the value of the brightness setting. Stripe 618 provides a visual indicator of the value of the shadows setting. Stripe 620 provides a visual indicator of the value of the highlights setting. Stripe 622 provides a visual indicator of the value of the black setting. In some embodiments, each stripe extends from the center of the image editing control (e.g., an image editing slider) to the control knob of that image editing control. For example, stripe 612 extends from the center of the exposure control to the control knob 252.

As previously described, some embodiments rig the image editing controls 212-222 with different relationships based on different characteristics of different images being edited. The master control 210 value in FIG. 6 is the same as the master control 210 value in FIG. 4. However, the image being edited in FIG. 6 is the same as the image being edited in FIG. 5, which is different than the image being edited in FIG. 4. Therefore the image editing controls 212-222 have different values in FIG. 6 than in FIG. 4.

In addition to the stripes 612-622 and the control knobs 252-262, the indicators 232-242 display numbers that indicate the value of the corresponding setting. For example, indicator 232 displays a number (here, −0.09) that indicates that the exposure setting of exposure control 212 has a value of −0.09 in this figure. Similarly, indicator 230 displays a number (here, 0.96) that indicates that the master control setting of master control 210 has a value of 0.96 in this figure. Because the characteristics (e.g., average gray value, gray value at a given percentile of the pixels, etc.) of the image in thumbnails 501-505 are different from the corresponding characteristics of image 107, the values of the image editing controls 212-222 are different from the corresponding values in FIG. 4, even though the master control 210 value is the same in both figures (i.e., 0.96 in both FIGS. 4 and 6).

Not only are the rigged values of image editing controls 212-222 different in FIGS. 4 and FIG. 6, but the nature of the relationships between the values are different for different images in some embodiments. For example, when editing the image 107, the relationship between the master control 210 and the image editing control 212 is linear in FIGS. 2-4. However, when editing the image in thumbnails 501-505, the relationship between master control 210 and image editing control 212 is non-linear in FIGS. 5-6. Furthermore, in these figures, the relationship results in a positive value (here, 0.10) of image editing control 212 when the master control 210 value is 0.08 and a negative value (−0.09) of image editing control 212 when the master control 210 value is 0.096. Similarly, none of the values of image editing controls 212-222 in FIG. 6 have the same relationship with the master control 210 as the values of the image editing controls 212-222 in FIG. 4.

Figure 7:
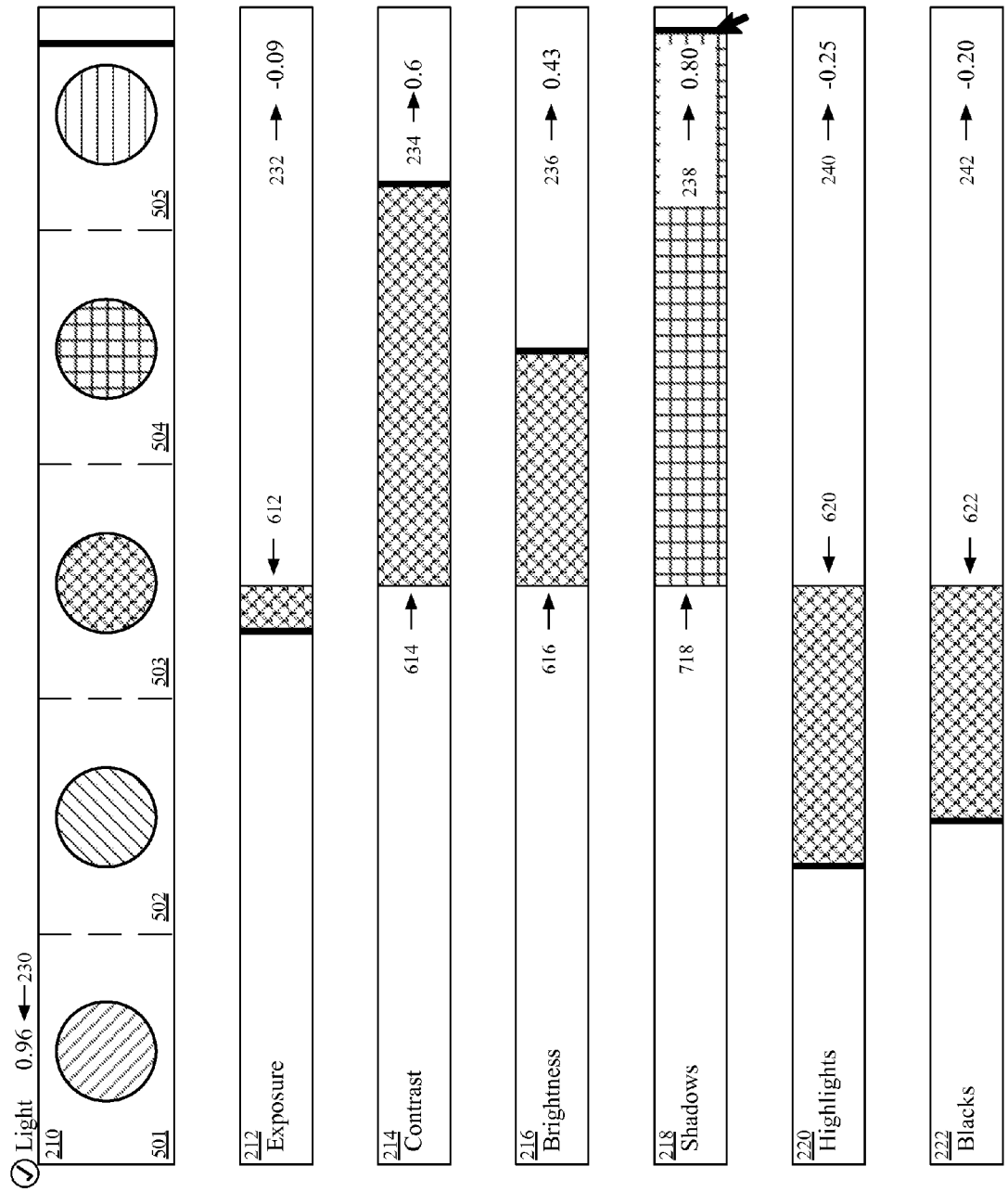
FIG. 7 illustrates multiple controls rigged to a master control when one control is adjusted independently of the master control.

As described above, the image editing applications of some embodiments rig multiple image editing controls to a single master control, based on relationships determined by characteristics of the image being edited. However, in some embodiments, the application allows the user to break the relationship between one or more of the image editing controls and the master control. In some embodiments, when the application receives a command to adjust one of the image editing controls independently of the master control, the image editing application adjusts the value of the setting represented by that control, without adjusting the other controls. FIG. 7 illustrates multiple controls rigged to a master control when one control is adjusted independently of the master control. The figure is identical to FIG. 6 except that shadows control 218 has been directly adjusted by the user (e.g., via a click and drag command), stripe 618 of FIG. 6 has been replaced by stripe 718, and indicator 238 indicates a value of 0.80 for the shadows control 218 instead of the value of 0.40 for the shadows control 218 set by the master control 210 in FIG. 6.

Some embodiments display the stripes of manually adjusted controls in a different color or pattern than the stripes of automatically adjusted controls. Accordingly, in the embodiment of FIG. 7, the stripe 718 is a different color (indicated in the figure by a different pattern) than the stripes 612-616, 620, and 622. In some embodiments, once an image editing control has been adjusted manually, that control will no longer be rigged to the master control 210 (e.g., until a new image is loaded, a reset control is activated, or an automatic adjustment control is activated). In such embodiments, adjusting the master control 210 will adjust the other rigged controls, but not the formerly rigged control that has been manually adjusted. In other embodiments, a manually adjusted control will return to being rigged to the master control 210 when the master control 210 is next adjusted. In such embodiments, the manual setting will only remain until the master control 210 is adjusted to a new setting. When the master control is adjusted to a new setting, the manually adjusted image editing control of such embodiments will change to a value determined by the master control value and the relationship between the image editing control and the master control value. Some embodiments provide options for the permanent unrigging of a manually adjusted control or the temporary unrigging of a manually adjusted control. The active option in some such embodiments is based on user preferences.

The relationships illustrated in FIGS. 3-7 are provided for illustration purposes only and different relationships are used in different embodiments. Examples of the calculation of relationships for various image editing controls are described in Section II, below.

II. Rigging the Master Control to the Image Editing Controls

The image editing application of some embodiments rigs multiple image editing controls to a master control based on different relationships. In some embodiments, the relationship between the master control and a particular image editing control is based on characteristics of the image being edited. These characteristics, in some embodiments, are statistics about the image.

Figure 8:
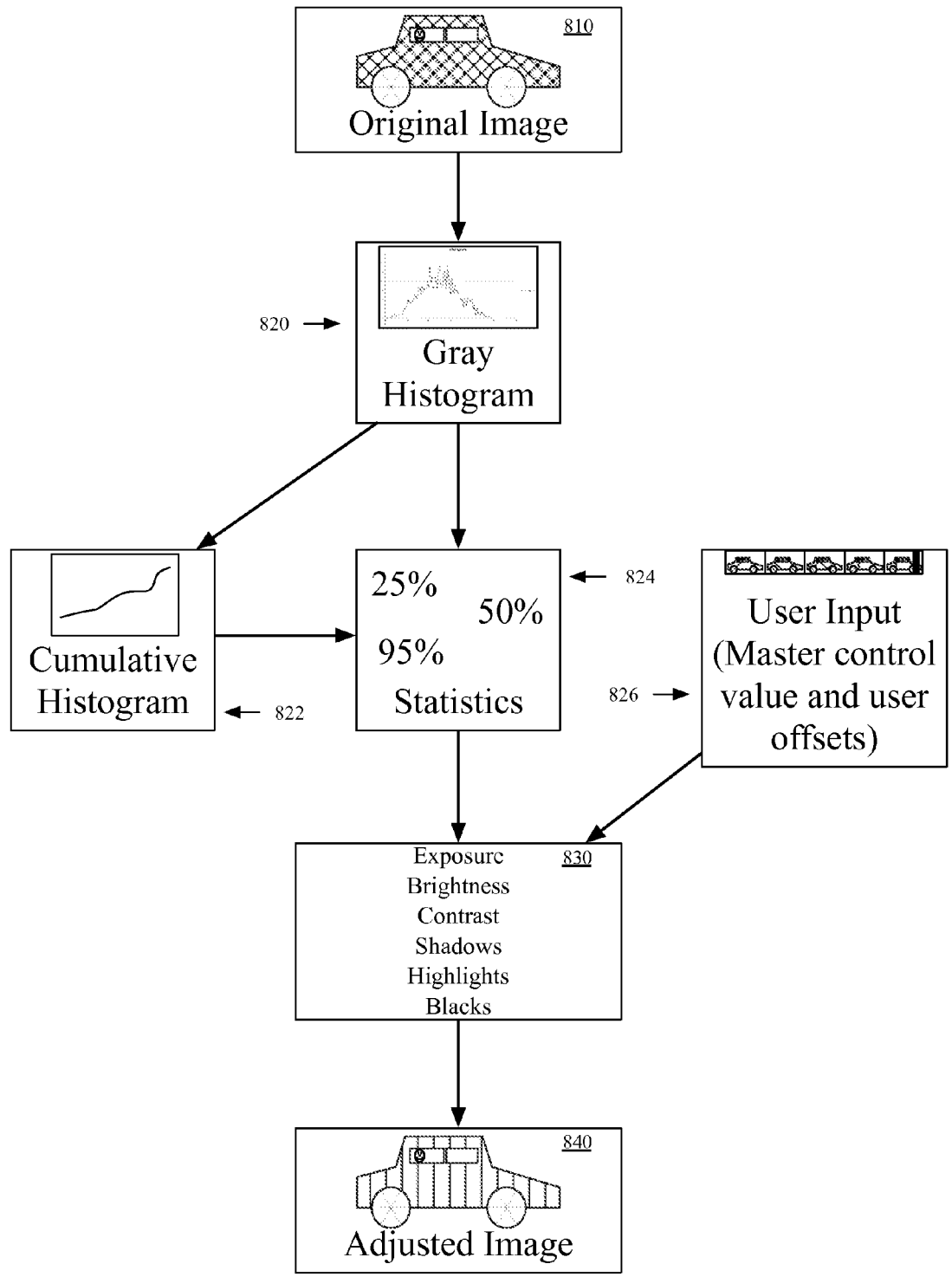
FIG. 8 conceptually illustrates factors for adjustment of an image by a set of image editing controls rigged to a master control.

FIG. 8 conceptually illustrates factors for adjustment of an image by a set of image editing controls rigged to a master control. The figure includes an original image 810, a gray (e.g., luminance based) histogram 820, a cumulative histogram 822, a set of statistics 824, a user input 826 on a master control (and other controls), a set of image editing controls 830, and an adjusted image 840.

In some embodiments, the image editing application analyzes the original image 810 in multiple ways. For example, some embodiments generate a histogram 820 of gray values of the image. The image editing applications of some embodiments determine the gray values of the pixels in the image in an RGB format. The RGB format in such embodiments is either the native format of the image, or the image is translated into the RGB format from some other format (e.g., YUV format HSV format, etc.).

In some embodiments that use RGB values to calculate gray values for the gray histogram, the gray value of each pixel in the image is calculated based on eq. (1).

$$\text{Gray} = (R+G+B)/3 \quad (1)$$

In eq. (1), above, the R, G, and B values represent the red, green, and blue color components of the pixel, respectively. The gray value represents the average of the R, G, and B color components.

The gray values of the individual pixels are used to generate a histogram 820 (e.g., a set of data matching individual gray values with the number of pixels having those gray values). In some embodiments, the image editing application bases one or more relationships between the master control and the image editing controls on the gray histogram 820 data. While image editing applications of some embodiments determine gray values in an RGB format, image editing applications of other embodiments calculate gray values based on component values in other formats (e.g., the gray value in some embodiments is the Y component of a YUV image, etc.). In some embodiments, the gray histogram and cumulative histogram are calculated as histogram data and are not actually displayed in graph form.

Some embodiments use the gray histogram 820 data to calculate a cumulative histogram 822. The cumulative histogram 822 matches each gray value to the number of pixels at or below that gray value. In some embodiments, the cumulative histogram 822 is generated based on the gray histogram 820. However, in other embodiments, the cumulative histogram 822 is calculated independently of, or instead of, the gray histogram 820. In some embodiments, various statistics 824 are determined based on the cumulative histogram 822 data. For example, some embodiments determine a median gray level of the image (e.g., a gray level at which 50% of the pixels have a higher gray value and 50% of the pixels have a lower gray value). Some embodiments determine a series of percentiles from the cumulative histogram data (e.g., the 0.2 percentile, and the $2^{nd}$, $10^{th}$, $25^{th}$, $50^{th}$, $75^{th}$, $90^{th}$, percentiles).

Some embodiments determine some statistics from the histogram 820 (e.g., a statistic representing the geometric mean of the gray values of the image). In some embodiments, the relationships between the master control values are directly determined based only on the statistics 824. In some such embodiments, the histogram 820 and/or cumulative histogram 822 are used to calculate the statistics 824 rather than directly referred to in determining the relationships. In other embodiments, some or all relationships are based in part or in whole on the histogram 820 and/or cumulative histogram 822 data directly, rather than being based on statistics derived from the histogram 820 and/or cumulative histogram 822.

The above described embodiments derive the percentile based statistics from the cumulative histogram 822. However, in other embodiments, these statistics 824 are calculated independently or instead of the cumulative histogram 822. Similarly, the geometric mean, in some embodiments, is calculated directly from the image data, instead of being calculated from the histogram 820. In some embodiments, one or more statistics are calculated based on the histogram, one or more are calculated based on the cumulative histogram, and one or more are calculated directly from the image.

Some embodiments derive a "key" value of the image, defined herein as a geometric mean of the gray values of the image. A geometric mean of a set of n numbers is defined as the nth root of the product of the numbers. In some embodiments, the geometric mean of the gray values is calculated using logarithms, which one of ordinary skill in the art will understand is a less computationally intensive method of determining a geometric mean than determining a product of a large number of values and finding the nth root of the numbers. Some embodiments use eq. (2) to calculate the key value for an image $$\log(geo) = \text{Sum}(\log(\text{Gray}[x,y]+\epsilon))/\text{pixels} \quad (2)$$

In eq. (2), the "Sum" is a summation over all pixels in the image. "Gray[x,y]" represents the gray value for a pixel at coordinates x and y in the image. The "pixels" represents the number of pixels in the image. The "$\epsilon$" is a small constant provided to avoid taking a logarithm of zero for gray values of zero. The "geo" represents the geometric mean of the gray values of the image and thus the "key" value of the image. In some embodiments, the geometric mean is then calculated by raising the base of the logarithm (e.g., 10, e, 2, etc.) to the power of log(geo). In other embodiments, the image editing application uses the log of the geometric mean to determine one or more relationships between the master control and the image editing controls instead of using the actual geometric mean.

Some embodiments also derive an "inverse key" value of the image, defined herein as a geometric mean of 1 minus the gray values of the image. In some embodiments, the geometric mean of 1 minus the gray values is calculated using logarithms. Some embodiments use eq. (3) to calculate the key value for an image $$\log(\text{inverse geo}) = \text{Sum}(\log(1-\text{Gray}[x,y]+\epsilon))/\text{pixels} \quad (3)$$

In eq. (3), the "Sum" is a summation over all pixels in the image. "Gray[x,y]" represents the gray value for a pixel at coordinates x and y in the image. The "pixels" represents the number of pixels in the image. The "$\epsilon$" is a small constant provided to avoid taking a logarithm of zero for gray values of one. The "inverse geo" represents the geometric mean of 1 minus the gray values of the image, and thus the "inverse key" of the image. In some embodiments, the geometric mean is then calculated by raising the base of the logarithm (e.g., 10, e, 2, etc.) to the power of log(inverse geo). In other embodiments, the image editing application uses the log of the geometric mean to determine one or more relationships between the master control and the image editing controls instead of using the actual geometric mean.

In some embodiments, the image key is a good indicator of the overall brightness/darkness of an image, and when the key is low and the inverse key is also low, that gives the user a good indication that the image itself is probably backlit or bimodal. Some embodiments also generate one or more automatic enhancement values for the image based on the statistics, which the image editing application uses to set the master control if an automatic adjustment feature is selected. Some embodiments use a number of different equations to calculate this automatic adjustment value, depending on the other statistics calculated for the image. For instance, some embodiments use different values depending on whether the image is especially dark, is overexposed, or fits several other criteria defined by the calculated statistics.

For example, when the image is overexposed (defined, e.g., as p25+p50 being greater than 0.6, where p25 and p50 are the $25^{th}$ and $50^{th}$ percentile gray values, respectively, some embodiments calculate the automatic adjustment value using one of the two following equations:

$$\text{autoValue} = p25 + p50 - 0.4 \quad (4A)$$

$$\text{autoValue} = p25 + p50 - 0.7 \quad (4B)$$

The "autoValue" is the automatic adjustment value used to set the master light control in some embodiments. In some embodiments, the first eq. (4A) is used when the p98 value (i.e., the $98^{th}$ percentile gray value) is greater than or equal to 1.0, and the second eq. (4B) is used when the p98 value is less than 1.0.

When the image is not overexposed, the image editing application of some embodiments uses one of the following two equations to calculate the autoValue:

$$\text{autoValue} = 0.6 - p50 - p25 \quad (4C)$$

$$\text{autoValue} = (0.6 - p50 - p25) + \min(0.8 - \text{InvKey}, 0.2) \quad (4D)$$

That is, for darker images, defined in some embodiments as those images for which the InvKey value is greater than 0.8, the application adds the additional factor in eq. (4D) to the otherwise calculated automatic value of eq. (4C). In this case, the InvKey value is the inverse key defined by eq. (3) above.

Finally, for certain images, the application will make the autoValue negative. That is, the application uses, for the actual automatic adjustment value, the negative of the autoValue calculated using one of eq. (4A)-(4D). Specifically, if either (i) p2>0.015 and p98>0.95 and p50>0.14 (i.e., the image is especially light), or (ii) p2>0.055 (the image has very few dark pixels), then the application takes the negative of the previously calculated autoValue for use in setting the master light control of some embodiments.

From the calculated statistics 824, the image editing application determines relationships between the master control values and the image editing controls which control the exposure, brightness, contrast, shadows, and highlights adjustments. In some embodiments, the master control values are scaled to a range of −2 to 2. In other embodiments, the master control values are scaled to a range of −1 to 1. In still other embodiments, the master control is scaled to other ranges.

In some embodiments, the image editing application provides a master control with linear values, which are then adjusted by a non-linear value derived from the master control value. Some embodiments use eq. (5) to determine this non-linear value. Some embodiments then use one or both of the master control value and the non-linear value to determine the relationship between the master control value and the individual image editing controls.

$$NL(master)=abs(master)^{1.3} \qquad (5)$$

In eq. (5), NL(master) is the non-linear value derived from the master control value. The "master" is the value of the master control (as set by the user). The function "abs" is the absolute value function. In embodiments which use eq. (5) to compute the non-linear value, the non-linear value increases slowly with low but increasing magnitude of the master control value, then more quickly as the magnitude of the master control value gets larger. In some embodiments, the non-linear value is calculated using exponents other than 1.3. In other embodiments, the non-linear value is calculated using other formulas.

Some embodiments then determine a set of image adjustment values 830 based on a master control value 826 and the statistics 824 (derived from the histogram 820 and cumulative histogram 822, in some embodiments). In addition, the adjustment values may be affected in some embodiments by user offsets (i.e., user input to the individual controls separate from the master controls). The image editing application then applies these image adjustment values to generate an adjusted image 840. While the image statistics and adjustments are calculated for the light controls, some embodiments perform a similar statistics calculation for color controls, including calculating color statistics and an automatic adjustment value for a master color control.

Figure 9:
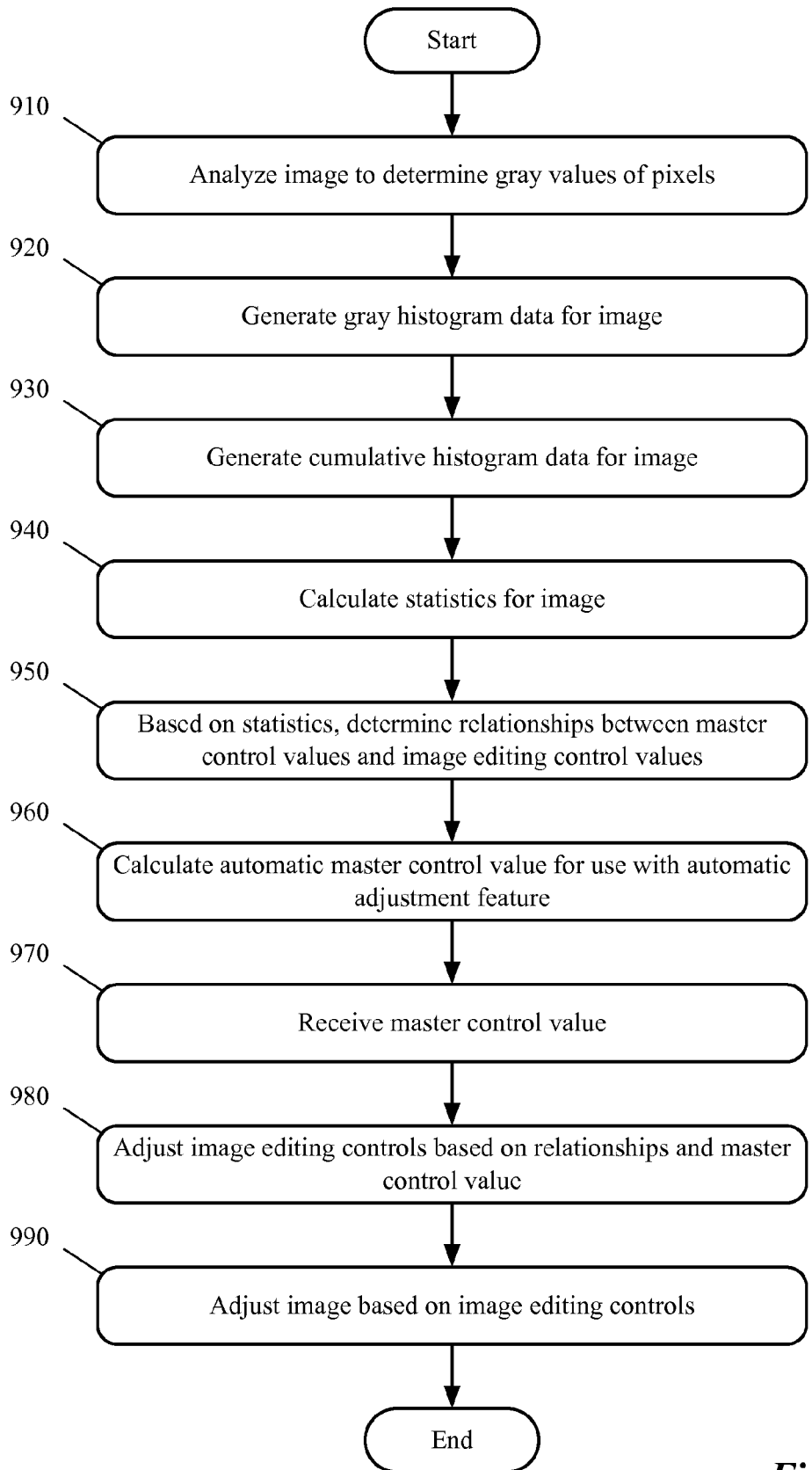
FIG. 9 conceptually illustrates a process for adjusting an image based on a master control value and statistics of the image to be edited.

FIG. 9 conceptually illustrates a process 900 for adjusting an image based on a master control value and statistics of the image to be edited. Various operations of FIG. 9 will be described with references to items in FIG. 8. The process 900 analyzes (at 910) the image to be edited to calculate gray values for the pixels (e.g., using eq. (1)). In some embodiments, measures of brightness other than a gray value are calculated instead of or in addition to the gray value. For example, in some embodiments, luminance values are used instead (e.g., Y values in a YUV translation of the image). The process then generates (at 920) a histogram (e.g., histogram 820 of FIG. 8) based on the gray values of the pixels in the image (or in other embodiments, based on luminance values, etc.). The process 900 then generates (at 930) a cumulative histogram of the image. In some embodiments, as indicated in FIG. 8, the cumulative histogram is calculated from the data of the gray histogram. In other embodiments, the cumulative histogram is calculated independently of the gray histogram (e.g., calculated from the image data directly).

The process 900 then calculates (at 940) statistics for the image. The image editing applications of some embodiments calculate statistics such statistics 824 of FIG. 8. For example the statistics may include various percentiles of the image, geometric means of gray values, etc. The process 900 then determines (at 950), based on the calculated statistics, relationships between the master control values and the image editing control values. In some embodiments, these relationships are determined directly (e.g., identifying a function of the master control value and plugging the actual master control value into that function). In other embodiments, these relationships are determined implicitly, using various different formulas and conditional statements based on the statistics to calculate particular values of the image editing controls based on a current master control value. Examples of determining such relationships are provided in sub-sections II.A.-II.E and section III, below. In some embodiments, the process 900 calculates (at 960) an automatic master control value to use to edit the image in the event that a user later activates the auto-adjust control (e.g., auto-adjust control 170 of FIG. 1). However, in other embodiments, the calculation of an automatic master control value is performed earlier or later than in process 900.

The process 900 then receives (at 970) a master control value (e.g., from a user or from some other automated process). The process 900 then adjusts (at 980) the image editing controls (e.g., the image editing controls 830 of FIG. 8) based on the relationships and the master control value (as described in further detail in sub-sections II.A.-II.E and section III, below). These values may additionally be set by the user individually adjusting one of the controls as well. The process 900 then adjusts (at 990) the image using the values of the newly adjusted image editing controls. The process 900 then ends. While operations 970-990 are described as part of the same conceptual process as operations 910-960, one of ordinary skill in the art will recognize that in some embodiments, these two sets of operations are two separate processes. That is, the first set of operations 910-960 may be performed when an image is opened in the image editing application, whereas the operations 970-990 are performed at a later time upon the receipt of a setting for a master control value (based on, e.g., user input to move the master control value, or input to select an auto-adjustment feature that automatically sets the master control value).

Although the process 900 is described with respect to the light based master control, in some embodiments, the image editing application performs a similar process for other image editing controls, such as a color based image editing control and a black and white conversion settings control. In some embodiments, the image editing application determines the automatic adjustment settings for multiple master controls independently of each other. However, in some such embodiments, the activation of a single auto-adjustment control sets each master control to the pre-calculated value. Additionally, in some embodiments, various statistics are also used to calculate automatic adjustments to image editing features that are not rigged to any master control (e.g., image editing algorithms controlled by independent controls or even algorithms not accessible by controls other than the automatic adjustment control).

As described previously, the image editing application of some embodiments uses the calculated statistics to determine relationships between master control values and image editing control values. The following sub-sections II.A.-II.E and section III, below describe how each of the relationships between master control values and the exposure, contrast, shadows, highlights, and brightness values are calculated, in some embodiments, from the various statistics described above. The available settings of each control in the illustrated embodiments range from −1 to 1. However, one of ordinary skill in the art will understand that in other embodiments the image editing controls can be scaled to any desired setting range.

A. Exposure

In some embodiments, an exposure adjustment to an image multiplies each luminance value (or in some embodiments each red, green, and blue color value) by a fixed amount. Because the change in the value is proportional to the original value, an exposure adjustment has a greater effect on brighter pixels (with high original values) than on dimmer pixels (with low original values). The larger the exposure value, the larger the amount used to multiply the luminance values of the image. In some embodiments, positive values of the exposure setting cause the image editing application to multiply the values of the pixels (e.g., the luminance value, or red, blue, and green values, etc.) by an amount greater than one (e.g., 1.5, 2, etc.) and negative exposure settings cause the image editing application to multiply the values of the pixels by an amount less than one (e.g., 0.5, 0.75, etc.). Various embodiments use various different methods to convert the exposure value into a multiplier (e.g., some embodiments raise a particular number to the power of the exposure setting to generate the multiplier).

When determining a relationship between the master control value and the exposure value, some embodiments determine the relationship based on how much "headroom" is available in the image. The headroom is determined, in some embodiments, by the $98^{th}$ percentile (gray value) statistic. That is, 98% of the pixels have a gray value lower than or equal to the gray value of the $98^{th}$ percentile. When this value is low compared to the maximum possible gray value (e.g., 0.2 when the maximum possible gray value is 1), then the image is very dark and the exposure has room to be increased without losing too much highlight detail (sometimes called "blowing out the highlights"). That is, without sending too much of the image to a maximum available brightness such that detail is lost. When this value is high compared to the maximum possible gray value (e.g., 0.9 when the maximum possible gray value is 1), then the image is very bright and the exposure has little room to be increased without losing too much highlight detail.

Some embodiments use eqs. (6A)-(6C) to determine a value for the exposure control based on the value of the master control.

$$\text{exHeadroom} = 1 - p98 \qquad (6A)$$

$$\text{exScale} = \max((\text{exHeadroom} - NL(\text{master})), -0.25) \qquad (6B)$$

$$\text{exposure} = \text{exScale} * \text{master} \qquad (6C)$$

In eqs. (6A)-(6C), "exHeadroom" represents the headroom of the image (e.g., how much the exposure can be increased without losing too much highlight detail). The "p98" represents the gray value of the $98^{th}$ percentile of the gray values in the image. The "exScale" represents a scale for the exposure control. The "NL(master)" is the non-linear term derived from the value of the master control (e.g., using eq. (5)). The "master" represents the value of the master control, set by the user. The function "max" in eq. (6B) represents a selection of the maximum of the two comma separated values. While the difference between the headroom value and the non-linear value is greater than −0.25, the exScale will be determined by the difference between the headroom value and the non-linear value. When the difference between the headroom value and the non-linear value is less than −0.25, the exScale will be set to −0.25.

Too high an exposure value tends to result in a loss of highlight detail. Therefore, the exScale value is low when there is little headroom. This results in exposure values for bright images increasing slowly in relation to the master control value. However, there are also other settings that tend to result in a loss of highlight detail at higher settings, even for darker images. For example, the contrast setting (described below) spreads out the mid-range gray values of the image. Therefore a high contrast value tends to result in a loss of highlight detail. In some embodiments, the contrast value depends on the non-linear value derived from the value of the master control. To avoid having both the contrast and the exposure values increase the brightness of the brightest pixels, some embodiments lower the exposure values for portions of the master control value range that produce a high contrast value.

In some embodiments, eq. (6B) lowers the exposure values for master control values that produce a high contrast value. For example, in some embodiments, when the original image is a dark image (e.g., the headroom is large), the non-linear value (NL(master)) will be low for low values of the master control. Therefore, the exScale will be relatively large and the exposure value will be positive and increase quickly (as a function of the master control value) when the value of the master control is low but increasing. When the value of the master control gets larger however the non-linear value (NL(master)) gets larger and the exScale will decrease, eventually becoming negative in some cases. Therefore at high master control values, the exposure value will be low or even negative. The effect of a negative exposure value is to darken the overall image. Darkening the image with a negative exposure value allows the image editing application to increase the contrast (which spreads out the luminance values of the image) without blowing out the highlights.

In some embodiments, it is possible for pixels of an image being edited to have gray values (e.g., average color component values) that exceed the maximum allowable values for that type of image. This occurs when (i) a first image adjustment that increases the gray values of an image (e.g., a brightness increase), increases the average color component value of pixels beyond the allowable range of the image, but (ii) the image editing application keeps track of the value rather than immediately restricting it to an allowed value. This tracking of non-allowed values is performed so that if a later adjustment (e.g., an exposure decrease) reduces the pixel values into the allowable range, the differences between multiple pixels that have crossed the maximum allowable threshold are preserved.

In some embodiments, when an image includes pixels beyond the allowable range, the image editing application uses eqs. (7) instead of eq. (6B) to calculate an exposure scale.

$$\text{exScale} = -\log 2(\text{whitepoint}) \qquad (7)$$

In eq. (7), "exScale" represents a scale for the exposure control. The function "log2" in eq. (7) represents the logarithm (in base 2) of the input value. The whitepoint represents the maximum gray value of the pixels in the image. As the whitepoint is greater than 1 (which is a condition for using eq. (7)), the exScale produced by eq. (7) is always negative. Accordingly, whenever a threshold percentage of pixels are beyond an allowable threshold, increasing master control values cause decreases in exposure settings.

B. Contrast

The contrast setting spreads out the luminance values of the middle luminance pixels of the image and compresses the luminance values of the bright and dark pixels of the image. The higher the contrast setting, the more the middle luminance values are spread out and the more the dark and bright luminance values are compressed. The "contrast" as a characteristic of the image refers to the range of luminance (or gray) values of the majority of pixels in the image. "Contrast setting" (or "contrast value") refers to the value of a control for increasing the contrast characteristic of the image. For example, in some embodiments, the contrast characteristic of an image is computed as the difference between the gray value of the $98^{th}$ percentile of pixels and the gray value of the $2^{nd}$ percentile of pixels. The smaller the original contrast characteristic of an image, the larger the contrast setting is needed to spread the luminance values out to provide a desirable amount of contrast in the edited image. Accordingly, some embodiments use eqs. (8A)-(8B) to determine a contrast setting based on the initial contrast characteristic of the image.

$$\text{imageContrast} = p98 - p2 \quad (8A)$$

$$\text{contrast} = \min(1.75 * NL(\text{master})/\text{imageContrast}, 2*NL(\text{master}))/3 \quad (8B)$$

In eqs. (8A)-(8B), "p98" represents the gray value of the 98$^{th}$ percentile of pixels in the image. The "p2" represents the gray value of the 2$^{nd}$ percentile of pixels in the image. The "imageContrast" is the difference between the gray value of the 98$^{th}$ percentile and the gray value of the 2$^{nd}$ percentile of gray values of pixels in the image. Therefore, the imageContrast represents the range of gray values for most of the pixels in the original image. The "NL(master)" is the non-linear term derived from the value of the master control (e.g., using eq. (5)). The "contrast" represents the contrast value used to edit the image. The "min" function selects the lower of the two comma separated vales.

The contrast is proportional to the NL(master) and thus increases when the master control value increases. Generally, the higher the initial imageContrast value, the lower the value of the contrast setting should be. Accordingly, the contrast value for part of the range of master control values is inversely proportional to the imageContrast value of the original image. That is, when the gray values of the image are within a narrow range, the contrast control will increase faster in relation to the master control value. In other words, an image with a higher image contrast will result in a lower contrast setting for a particular master control value than an image with a lower image contrast setting will.

The "min" function prevents the contrast value from getting too high when the imageContrast is too low. That is, for images with very narrow ranges of gray values, the contrast value is capped at 2*NL(master). In some embodiments, the contrast value is tempered to keep it within a desirable range. Here, the contrast value is divided by 3 to keep it within a desirable range. However, one of ordinary skill in the art will understand that the constants used in the above equations (e.g., 1.75, 2, 3) are different in some embodiments for subjective esthetic reasons or because those embodiments use different ranges of master control values, non-linear values based on the master control values, and/or contrast values.

As mentioned above with respect to the exposure setting, a high contrast setting tends to result in a loss of highlight details. Accordingly, as the master control value drives the contrast to higher values, the exposure value is reduced and in some cases becomes negative.

C. Shadows

The shadows setting determines how much to spread out the luminance values of the darker pixels of the image. The higher the shadows setting, the greater the resulting luminance range of the originally dark pixels in the image. When an image has a large number of bright pixels, then the image may be rather overexposed. For an overexposed image, it is not desirable to increase the range of the darker pixels by a large amount. Therefore, for an overexposed image, the relationship between the master control and the shadows control in some embodiments results in a slow increase of the shadows value as the master control value increases. In contrast, for an underexposed image (e.g., an image in which the p98 gray value and/or inverseKey stats are low), it is desirable to increase the luminance range of the darker pixels in the image by a greater amount. Therefore, for an underexposed image, the relationship between the master control and the shadows control in some embodiments results in a rapid increase of the shadows value as the master control value increases.

The exposure level (underexposed or overexposed) can be determined by statistics relating to the brighter pixels (e.g., the p98 gray value and/or the inverse key value). Therefore, in some embodiments, the relationship between the master control values and the shadows values is based on the statistics relating to the brighter pixels. As we saw with the exposure setting, the effect of the shadows setting is also greatly impacted by the contrast setting. When the contrast setting is high, the luminance values of the darker pixels will be compressed. Compressing the luminance of the darker values will reduce the effect of a given shadow value on the image. Accordingly, in some embodiments, to compensate for a high contrast setting, the image editing application boosts the shadows setting. However, if the contrast value is low, then the shadows setting is more effective for a given shadows value. Therefore, some embodiments generate the relationship between the master control values and the shadows values based on the median (p50) gray value. A high value for the median gray value generally indicates a brighter (e.g., overexposed) image. Accordingly, when the median is high, the relationship will cause the shadows value to increase more slowly as a function of the master control value. That is, the shadows value is increased in response to a high contrast value and decreased in response to a low contrast value.

Some embodiments use eqs. (9A)-(9C) to calculate a shadows value based on the master control value.

$$\text{shadowNorm} = \max(\min(p98, \text{inverseKey}), 0.5) \quad (9A)$$

$$\text{shadowScale} = \min((1-p50)*(0.35/\text{contrast})/\text{shadowNorm}), 0.85) \quad (9B)$$

$$\text{shadows} = \text{master} * \text{shadowScale} \quad (9C)$$

In eqs. (9A)-(9C), "p98" represents the gray value of the 98$^{th}$ percentile of gray values of pixels in the image. The "inverseKey" represents the inverse key of the image (e.g., as calculated by eq. (3)). The "min" function returns the smaller of the comma separated values. The "max" function returns the larger of the comma separated values.

As indicated above with respect to eq. (3), in some embodiments, the inverseKey is the log of the geometric mean of 1 minus the gray values; in other embodiments the inverseKey is the geometric mean of 1 minus the gray values. The inverseKey is larger when there are a larger number of dark pixels in the image and is smaller when there are a larger number of bright pixels in the image. The p98 value is small when almost all of the pixels of the image are dark and large when more than 2% of the pixels of the image are bright. The "shadowNorm" is a measure of how dark or bright the image is according to the 98$^{th}$ percentile of gray values (p98) and the inverse key (inverseKey). When either the p98 or the inverseKey are below 0.5, the shadowNorm is set to 0.5. When both the p98 and inverseKey are above 0.5, the shadowNorm is set equal to the smaller of p98 or inverseKey. In order for both p98 and inverseKey to be above 0.5, the image would have to have a large number pixels darker than 0.5, but still have more than 2% of its pixels above 0.5. The images with the highest shadowNorm values would be images that were generally very dark, but with at least a threshold percentage (e.g., more than 2%) of very bright pixels.

The "master" represents the value of the master control (e.g., as set by a user). The "p50" represents the median gray value of pixels in the image. The "contrast" represents the contrast value (e.g., as calculated by eqs. (8A)-(8B)). The "shadowScale" determines the relationship between the master control value and the shadows value. The shadowScale decreases for larger values of the median gray value, decreases for larger contrast values, and decreases for larger shadowNorm values (e.g., for dark images with a threshold percentage of bright pixels). In some embodiments, the shadowScale is capped (e.g., at 0.85 in eq. (9B) so that no images will cause the shadow values to increase too fast in relation to the master control values. Once the shadowScale is calculated, the relationship between the shadows value (represented by "shadows") and the master control value is determined based on the master control value and the shadowScale.

However, before calculating the shadows value, some embodiments perform a check for large dark bimodal regions, and modify the relationship between the master control value and the shadows value (represented by the "shadowScale" value) accordingly. Specifically, after calculating shadowScale in eq. (9B), some embodiments determine whether both (i) the $25^{th}$ percentile of gray values is less than 0.08 and (ii) the shadowScale value is less than 0.5, indicative of an image with large dark bimodal regions. For the $25^{th}$ percentile of gray values to be below 0.08 requires large portions of the image to be very dark. If this is the case, and the image has such large dark bimodal regions, some embodiments use eq. (9D) to calculate a new value for the shadowScale value:

$$\text{shadowScale}=\min(\text{shadowScale}*2.0, 1.0); \tag{9D}$$

This eq. (9D) indicates that if the image has large dark bimodal regions, some embodiments double the value of the shadowScale. Because eq. (9D) is only used if the shadowScale value is less than 0.5, this equation should always double the shadowScale. Because eq. (9C) is then calculated after this, the resulting effect is a doubling of the shadows setting value for images that fit the criteria representative of large dark bimodal regions.

D. Highlights

The highlights setting of some embodiments expands the gray values (or luminance values) of the brighter pixels of the image. The highlights setting is calculated using eqs. (10A) or (10B) in some embodiments. In some embodiments, eq. (10A) is used for images that are brighter than a threshold level (e.g., images with a p98 gray value greater than 0.85) and eq. (10B) is used for images that are darker than a threshold level (e.g., images with a p98 gray value less than or equal to 0.85).

$$\text{highlights}=-\min(0.8*NL(\text{master}), 0.75); \tag{10A}$$

$$\text{highlights}=-\min(0.8*\text{master}*p98, 0.75) \tag{10B}$$

In eqs. (10A)-(10B), "highlights" represents the highlights value. The "NL(master)" is the non-linear term derived from the value of the master control (e.g., using eq. (5)). The "master" represents the value of the master control (e.g., as set by a user). The "p98" represents the $98^{th}$ percentile of gray values of pixels in the image. Accordingly, for bright images, the relationship between the highlights value and the master control value is governed by eq. (10A). For less bright images, the relationship between the highlights value and the master control value is governed by eq. (10B). The highlights values of embodiments that use eqs. (10A) and (10B) are always negative for positive master control values. In some embodiments, decreasing the highlights compensates for the effects on the highlights of the controls that brighten the image. For images below the threshold brightness, the brighter the image is, the faster the highlights values drop as a function of the master control values.

Some embodiments further modify the highlights value if the whitepoint of the image (i.e., the single brightest pixel) has a value greater than 1. That is, if the brightest pixel in the image is brighter than the maximum allowed range, the highlights setting will be further modified using the below equations:

$$\text{rawhighlights}=-1.0/(1.25*\text{whitepoint}) \tag{10C}$$

$$\text{highlights}=-\min(0.65*NL(\text{master})*p98, 0.75) \tag{10D}$$

These equations, as mentioned, are only used in the case that the whitepoint has a value greater than 1. The "rawhighlights" value represents the RAW highlights, and eq. (10C) mandates linear behavior for this value. In some embodiments, as shown here, the highlights are calculated differently for RAW images compared to compressed images, due to the preservation of certain data in RAW images that is lost during image compression. The eq. (10D) modifies the highlights value for images with a whitepoint greater than 1, such that the value resulting from this equation is used rather than either of eq. (10A) or eq. (10B). For these images, the highlights values are based on both the non-linear term derived from the value of the master control and the $98^{th}$ percentile of gray values in the image. As with the eqs. (10A-10B), the highlights values are always negative for positive master control values.

E. Black

The black setting of some embodiments reduces the color component values of the pixels in an image by an amount proportional to the distance from the maximum allowed bright value (e.g., 1) and the black setting. For example, in some embodiments with an RGB color space with a scale from 0 to 1, an original color component value of 1 will not be reduced by the black adjustment. An original color component value of 0 will be reduced proportionately to the black setting. An original color component value of 0.5 will be reduced half as much as the color component value of 0 (for the same black setting).

In some embodiments, the black setting is calculated using eq. (11), in some embodiments.

$$\text{black}=20*\min(\text{master}*p10/\text{abs}(\text{autoValue}), p10) \tag{11}$$

In eqs. (11), "black" represents the black value calculated for the black control. The "master" represents the value of the master control (e.g., as set by a user). The "p10" represents the $10^{th}$ percentile of gray values of pixels in the image, also referred to as a blackpoint. The "autoValue" represents the automatic setting calculated for the master control (e.g., the value to which the master control will be set if a user activates the auto-adjust control). The "min" function selects the lower of the two comma separated vales. Accordingly, the black control setting will be proportional to the $10^{th}$ percentile of the gray vales and the master control value for master control values below the absolute value of the autoValue. For master control values above the absolute value of the autoValue, the black value will be equal to the $10^{th}$ percentile of the gray values of the image. For images that are darker below a threshold percentile (e.g., $10^{th}$ percentile), the black value will increase more slowly as a function of the master control value. For images that are lighter below a threshold percentile (e.g., $10^{th}$ percentile), the black value will increase more quickly as a function of the master control value.

F. Brightness

1. Initial Brightness Scale

A brightness adjustment in some embodiments adds a particular amount (positive or negative) to the values of each pixel (e.g., the luminance value or the red, green, and blue values, etc.). The value of the brightness setting determines what the amount will be. In some embodiments, the amount is equal to the brightness value, in other embodiments, the amount is determined by the brightness value, but is not identical to the brightness value (e.g., the amount added is a multiple of the brightness value in some embodiments).

In some embodiments, a large number of statistics determine the relationship between the master control value and the brightness value. In some embodiments, to calculate a brightness value, the image editing application first determines a brightness scale (brightScale), and then determines the brightness value based on the brightness scale and the master control value (e.g., using eq. (12A) or eq. (12B)).

$$\text{brightness}=\text{brightScale}*\text{master} \quad (12A)$$

In eq. (12A), "brightness" represents the value calculated for the brightness control. The "master" represents the value of the master control. The "brightScale" represents a multiplier used to translate the master control value into a brightness value.

In equations (13)-(16), described below, the calculated brightScale value will be positive. For positive brightScale values, the brightness value calculated with eq. (12A) will be positive when the master control value is positive. In equation (17), the calculated brightScale value will be negative. For negative brightScale values, the brightness value calculated with eq. (12A) will be negative when the master control value is positive. In some embodiments, a positive brightness control value increases the brightness of the image and a negative brightness control value decreases the brightness of the image.

In some embodiments, equations corresponding to eqs. (13)-(17) are reversed in sign from eqs. (13)-(17). In some such embodiments, eq. (12B) is used instead of eq. (12A). As the signs of both the brightScale values, and eq. (12A) are reversed, in such embodiments, the brightness value will still be positive when (i) the master control value is positive and (ii) the sign reversed eqs. (13)-(16) are used to calculate the brightScale, which will have a negative value. Similarly, the brightness value master control values calculated using the sign reversed equivalent of eq. (17) will still be negative when (i) the master control value is positive and (ii) the sign reversed eq. (17) is used to calculate the brightScale, which will have a positive value.

$$\text{brightness}=-\text{brightScale}*\text{master} \quad (12B)$$

In eq. (12B), "brightness" represents the value calculated for the brightness control. The "master" represents the value of the master control. The "-brightScale" represents a multiplier used to translate the master control value into a brightness value. Because of the sign reversal in eq. (12B) compared to eq. (12A), in embodiments that use eq. (12B), the brightness values will be positive when the master control value is positive and the brightScale values are negative. Similarly, in such embodiments, the brightness values will be negative when the master control value is positive and the brightScale values are positive.

To calculate the brightness scale (brightScale) The image editing application of some embodiments first uses a low percentile of gray values (e.g., the $25^{th}$ percentile (p25) of gray values of the pixels in the image) to determine how much to increase the brightness (make the image brighter) for positive values of the master control.

When the darkest 25% of pixels of the image are below a particular threshold value, some embodiments create a particular relationship between the master control value and the brightness value. For example, in some embodiments, when the $25^{th}$ percentile of gray values of the image is below 9% of the maximum possible gray value (e.g., below 0.09 for an image with allowable red, blue, and green values between 0 and 1), the image editing application uses eq. (13) to determine a brightness scale for calculating the brightness control value.

$$\text{brightScale}=3.5*(0.14-p25) \quad (13)$$

In eq. (13), "brightScale" represents an initial relationship between the master control value and the brightness value calculated for the brightness control (the initial relationship is subject to later adjustments based on other calculations). The "p25" represents the gray value of the $25^{th}$ percentile of gray values in the image. As the value of p25 is less than 0.09 (which, in this embodiment, is a required condition for using this equation), the brightScale value will be positive when this equation is used in this embodiment. As the master control value increases from zero, the brightness value will increase from zero to a positive value (brightening the image), at a ratio determined by a linear function of the gray value of the $25^{th}$ percentile of gray values of the original image.

When the darkest 25% of pixels of the image are between two particular threshold values, some embodiments create a different relationship between the master control value and the brightness value. For example, in some embodiments, when the $25^{th}$ percentile of gray values of the image are between 9% and 14% of the maximum possible gray value (e.g., between 0.09 and 0.14 for an image with allowable red, blue, and green values between 0 and 1), the image editing application uses eq. (14) to determine a brightness value for the brightness control.

$$\text{brightScale}=3*(0.14-p25)\char`\^0.5 \quad (14)$$

In eq. (14), "brightScale" represents an initial relationship between the master control value and the brightness value calculated for the brightness control (the initial relationship is subject to later adjustments based on other calculations). The "p25" represents the gray value of the $25^{th}$ percentile of gray values in the image. As the value of p25 is less than 0.14 (which, in this embodiment, is a required condition for using this equation), the relationship between the master control value and the brightness value will be positive. The magnitude of the relationship will be a non-linear function of the p25 value. As the master control value increases from zero, the brightness value will increase from zero to a positive value (brightening the image), at a ratio determined by a linear function of the gray value of the $25^{th}$ percentile of gray values of the original image.

When the darkest 25% of pixels of the image are between the second threshold value and a third threshold value, some embodiments create yet a different relationship between the master control value and the brightness value. For example, in some embodiments, when the $25^{th}$ percentile of gray values of the image are between 14% and 20% of the maximum possible gray value (e.g., between 0.14 and 0.20 for an image with allowable red, blue, and green values between 0 and 1), the image editing application uses eq. (15) to determine a brightness value for the brightness control.

$$\text{brightScale}=2*(p25-0.14)\char`\^0.5 \quad (15)$$

In eq. (15), "brightScale" represents an initial relationship between the master control value and the brightness value calculated for the brightness control (the initial relationship is subject to later adjustments based on other calculations). The "p25" represents the gray value of the $25^{th}$ percentile of gray values in the image. As the value of p25 is greater than 0.14 (which, in this embodiment, is a required condition for using this equation), the relationship between the master control value and the brightness value will be positive. The magnitude of the relationship will be a non-linear function of the p25 value. As the master control value increases from zero, the brightness value will increase from zero to a positive value, at a ratio determined by a non-linear function of the gray value of the $25^{th}$ percentile of gray values of the original image.

When the darkest 25% of pixels of the image are above the third threshold value, some embodiments create yet a different relationship between the master control value and the brightness value. For example, in some embodiments, when the $25^{th}$ percentile of gray values of the image are above 20% of the maximum possible gray value (e.g., above 0.2 for an image with allowable red, blue, and green values between 0 and 1), the image editing application uses eq. (16) to determine a brightness value for the brightness control.

$$brightScale=2*(p25-0.14) \qquad (16)$$

In eq. (16), "brightScale" represents an initial relationship between the master control value and the brightness value calculated for the brightness control (subject to later adjustments based on other calculations). The "p25" represents the gray value of the $25^{th}$ percentile of gray values in the image. As the value of p25 is greater than 0.2 (which, in this embodiment, is a required condition for using this equation), the relationship between the master control value and the brightness value will be positive. The magnitude of the relationship will be a linear function of the p25 value. As the master control value increases from zero, the brightness value will increase from zero to a positive value, at a ratio determined by a linear function of the gray value of the $25^{th}$ percentile of gray values of the original image.

In the above described embodiments, the determination of whether to use one of eqs. (15) or (16) was based on whether the darker pixels of the image are between the second and third threshold values (e.g., use eq. (15) when p25 is greater than 0.14 and less than 0.2) or greater than the third threshold (e.g., use eq. (15) when p25 is greater than 0.2). However, in some embodiments, an additional condition determines whether to use one of eqs. (15) and (16), above, or to use eq. (17), below. For example, in some embodiments, eqs. (15) and (16) are used when the gray values of the brightest pixels in the image are below a threshold gray value. In some embodiments, this condition is met when the $98^{th}$ percentile of gray values of the image is below 82% of the maximum possible gray value (e.g., p98 is less than 0.82). That is, when (i) p98 is less than 0.82 and (ii) p25 is between 0.14 and 0.2, some embodiments use eq. (15) to determine an initial brightness scale. Similarly, when (i) p98 is less than 0.82 and (ii) p25 is greater than 0.2, some embodiments use eq. (16) to determine an initial brightness scale. In contrast, when (i) p98 is greater than 0.82 and (ii) p25 is greater than 0.14, some embodiments use (17) to determine an initial brightness scale.

$$brightScale=0.14-p25 \qquad (17)$$

In eq. (17), "brightScale" represents an initial relationship between the master control value and the brightness value calculated for the brightness control (subject to later adjustments based on other calculations). The "p25" represents the gray value of the $25^{th}$ percentile of gray values in the image. As the value of p25 is greater than 0.14 (which, in this embodiment, is a required condition for using this equation), the relationship between the master control value and the brightness value will be negative. The magnitude of the relationship will be a linear function of the p25 value. As the master control value increases from zero, the brightness value will decrease from zero to a negative value, at a ratio determined by a linear function of the $25^{th}$ percentile of gray values of the original image. In other words, when an image is above a particular threshold brightness, the image editing application of some embodiments will reduce the brightness value of the image for positive master control values.

2. Adjustments to Brightness Scale

Once the image editing application of some embodiments calculates an initial brightness scale (brightScale), the image editing application calculates one or more adjustments to the brightness scale based on statistics of the image. Some of the equations used in the embodiments described below are only used when specific sets of conditions are met. In some embodiments, multiple adjustments are made when the condition(s) of more than one adjustment are met. In the equations below (eqs. (18)-(21)), "inbrightScale" will be used for the brightness scale before that particular adjustment and "outbrightScale" will be used for the brightness scale after that particular adjustment. In some cases, based on the statistics of the image and the settings of various image editing controls, the inbrightScale for any of equations (18)-(21) may be the outbrightScale of another adjustment equation or (if none of eqs. (18)-(21) have yet been used) the brightScale value calculated by any one of eqs. (13)-(17). Although eqs. (18)-(20) are shown in a specific order, one of ordinary skill in the art will understand that in other embodiments, the equations may be applied in other orders.

When the initial contrast of the image is low, then some embodiments increase the brightness value of the image by boosting the brightness scale using eq. (18). In some embodiments, the initial contrast of the image is determined to be low when (i) the imageContrast (e.g., imageContrast as calculated by eq. (8A)) is below a first threshold value (e.g., imageContrast is below 0.68 when the possible red, blue, and green values of the image range from 0 to 1, imageContrast is below 138 when the possible red, blue, and green values range from 0 to 255), (ii) the median gray value of the image is below a second threshold value (e.g., p50 is less than 0.35) and the very dark pixels of the image are brighter than a third threshold value (e.g., p2 is greater than 0.04). When those conditions are met, the image editing application of some embodiments uses eq. (18) to boost the brightness scale.

$$outbrightScale=inbrightScale/(imageContrast*(key-inverseKey)) \qquad (18)$$

In eq. (18), "outbrightScale" represents the adjusted brightness scale after eq. (18) is applied. The "inbrightScale" represents the brightness scale before eq. (18) is applied (e.g., the initial brightScale value calculated by one of eqs. (13)-(17)). The "imageContrast" represents a measure of the initial contrast of the image (e.g., as calculated by eq. (8A)). The "key" represents the geometric mean, or in some embodiments, the log of the geometric mean, of gray values of the image (e.g., as calculated by eq. (2)). The "inverseKey" represents the geometric mean, or in some embodiments, the log of the geometric mean, of 1 minus the gray values of the image (e.g., as calculated by eq. (3)).

In some embodiments, the brightness scale is boosted (or further boosted) by a fixed multiple when the image includes a large jump in gray values (e.g., 35% of the maximum gray value) between a lower percentile (e.g., the $25^{th}$ percentile) and a mid-range percentile (e.g., the median percentile). The image editing application of some embodiments uses eq. (19) to boost the brightness scale.

$$outbrightScale=inbrightScale*2.5 \qquad (19)$$

In eq. (19), "outbrightScale" represents the adjusted brightness scale after eq. (19) is applied. The "inbrightScale" represents the brightness scale before eq. (19) is applied (e.g., the initial brightScale value calculated by one of eqs. (13)-(17) or the outbrightScale calculated by eq. (18)).

In some embodiments, the sign of the brightness scale is reversed when some of the darker pixels of the image are above a particular threshold. For example, in some embodiments, when (i) the $10^{th}$ percentile of pixels is above 0.45 or (ii) the $25^{th}$ percentile of pixels is above 0.7, the brightness scale is adjusted according to eq. (20).

$$\text{outbrightScale} = -\text{inbrightScale} \quad (20)$$

In eq. (20), "outbrightScale" represents the adjusted brightness scale after eq. (20) is applied. The "inbrightScale" represents the brightness scale before eq. (20) is applied (e.g., the initial brightScale value calculated by one of eqs. (13)-(17) or the outbrightScale calculated by eqs. (18) or (19)).

Finally, in some embodiments, the brightness scale is prevented from being below or above particular threshold values. Various embodiments use different equations to prevent the brightness scale from being outside of the parameters. For example, the image editing applications of some embodiments use eq. (21) to restrict the brightScale value to being between −0.8 and 0.8.

$$\text{outbrightScale} = \max(\min(\text{inbrightScale}, 0.8), -0.8) \quad (21)$$

In eq. (21), "outbrightScale" represents the adjusted brightness scale after eq. (21) is applied. The "inbrightScale" represents the brightness scale before eq. (21) is applied (e.g., the initial brightScale value calculated by one of eqs. (13)-(17) or the outbrightScale calculated by eqs. (18), (19) or (20)). The "min" function selects the lower of the two comma separated vales. The "max" function selects the lower of the two comma separated vales. When eq. (21) is applied to an inbrightScale below −0.8, eq. (21) sets the outbrightScale to −0.8. When eq. (21) is applied to an inbrightScale above 0.8, eq. (21) sets the outbrightScale to 0.8. When eq. (21) is applied to an inbrightScale between −0.8 and 0.8 is adjusted by eq. (21), eq. (21) sets the outbrightScale to equal the inbrightScale. Although eq. (21) sets limits of −0.8 and 0.8, in other embodiments, the image editing application sets different limits on the allowable brightScale values. For example, in some embodiments, any calculated brightScale value below zero is changed to zero.

In still other embodiments, rather than merely setting negative brightScale values to zero, the image editing application uses eq. (22) to reverse the sign of any negative brightScale values calculated by the previous equations.

$$\text{outbrightScale} = \text{abs}(\text{inbrightScale}) \quad (22)$$

In eq. (22), "outbrightScale" represents the adjusted brightness scale after eq. (20) is applied. The "inbrightScale" represents the brightness scale before eq. (22) is applied (e.g., the initial brightScale value calculated by one of eqs. (13)-(17) or the outbrightScale calculated by any of eqs. (18)-(21)). The "abs" function returns the absolute value of the input. When the inbrightScale is positive, the outbrightScale is set equal to the inbrightScale. When the inbrightScale is negative, the outbrightScale is set to equal the magnitude of the inbrightScale (e.g., an inbrightScale of −0.25 will be changed to an outbrightScale of 0.25).

III. Negative Master Control Values

In some embodiments, the image editing control values are calculated based on the above values when the master control values are above the neutral level (e.g., for brightening the image) but are calculated differently when the master control values are below the neutral level (e.g., for darkening the image).

Some embodiments use eqs. (23A)-(23C) to calculate the shadows setting.

$$\text{shadowNorm} = \max(\min(p98, \text{inverseKey}), 0.5) \quad (23A)$$

$$\text{shadowLow} = \min(0.75 * \text{shadowNorm}, 0.5) \quad (23B)$$

$$\text{shadows} = -\text{master} * \text{shadowLow} \quad (23C)$$

In eqs. (23A)-(23C), "p98" represents the gray value of the $98^{th}$ percentile of gray values of pixels in the image. The "inverseKey" represents the inverse key of the image (e.g., as calculated by eq. (3)). As indicated above with respect to eq. (3), in some embodiments, the inverseKey is the log of the geometric mean of 1 minus the gray values, in other embodiments the inverseKey is the geometric mean of 1 minus the gray values. The "shadowNorm" is a measure of how dark or bright the image is according to the $98^{th}$ percentile of gray values (p98) and the inverse key (inverseKey). When at least one of the p98 and inverseKey are below 0.5 (e.g., for darker images), the shadowNorm is represented by the smaller of p98 or inverseKey. When both the p98 and inverseKey are above 0.5 (e.g., for brighter images), the shadowNorm is capped at 0.5. The "min" function returns the smallest of the comma separated values.

The "master" represents the value of the master control (e.g., as set by a user). The "shadowLow" determines the relationship between the master control value and the shadows value. The shadowLow increases for larger shadowNorm values (e.g., for brighter images). In some embodiments, the shadowLow is capped (e.g., at no more than 0.5 in eq. (23B)) so even very bright images with very low contrast values will not increase the shadow values too fast in relation to the master control values. Once the shadowLow value is calculated, the relationship between the shadows value (represented by "shadows") and the master control value is determined based on the master control value and the shadowLow value.

For a low contrast image, the image editing applications of some embodiments increase the contrast as the master control value drops (and the image darkens). Some embodiments use eqs. (24A)-(24C) to increase the contrast as the image darkens.

$$\text{imageContrast} = p98 - p2 \quad (24A)$$

$$\text{contrastScale} = \min(1/\text{imageContrast}, 1.25) \quad (24B)$$

$$\text{contrast} = \text{master} * (-\text{contrastScale}/3) \quad (24C)$$

In eqs. (24A)-(24C), "p98" represents the gray value of the $98^{th}$ percentile of pixels in the image. The "p2" represents the gray value of the $2^{nd}$ percentile of pixels in the image. The "imageContrast" is the difference between the gray value of the $98^{th}$ percentile and the gray value of the $2^{nd}$ percentile of gray values of pixels in the image. Therefore, the imageContrast represents the range of gray values for most of the pixels in the original image. The "master" is the value of the master control (e.g., set by the user). The "contrast" represents the contrast value used to edit the image. The "min" function selects the lower of the two comma separated vales.

The contrast value is proportional to the master value and thus increases when the master control value becomes more negative. Generally, the higher the initial imageContrast value, the lower the value of the contrast setting should be. Accordingly, the contrast value for part of the range of master control values is inversely proportional to the imageContrast value of the original image. That is, when the gray values of the image are within a narrow range, the contrast control will increase faster in relation to the master control value. The "min" function prevents the contrast value from getting too high when the imageConstrast is too low. That is, for images with very narrow ranges of gray values, the contrast value is capped at (master*1.25/3). In some embodiments, the contrast value is tempered to keep it within a desirable range. Here, the contrast value is divided by 3 to keep it within a desirable range. However, one of ordinary skill in the art will understand that the constants used in the equations (e.g., 1, 1.25, 3) are different in some embodiments for subjective esthetic reasons or because those embodiments use different ranges of master control values, non-linear values based on the master control values, and/or contrast values.

In some embodiments, for master control values below neutral, the brightness value is proportional to the master control value. In some embodiments, the proportionality is 1 to 1, as indicated by eq. (25A)-(25B):

$$brightScale=1 \quad (25A)$$

$$brightness=master*brightScale \quad (25B)$$

In eqs. (25A)-(25B), "brightScale" represents the relationship between the master control value and the brightness value. The "master" is the value of the master control (e.g., set by the user). The "brightness" represents the value of the brightness control.

Finally, in some embodiments, the highlights value is proportional to the master value and capped at a particular amount (e.g., 0.75) as shown in eq. (26).

$$highlights=\min(0.8*master*p98, 0.75) \quad (26)$$

In eq. (26), "highlights" represents the highlights value. The "master" is the value of the master control (e.g., set by the user). The "p98" represents the gray value of the $98^{th}$ percentile of pixels in the image. The "min" function selects the smaller of the two comma separated values. Some embodiments make additional adjustments when the whitepoint (i.e., the single brightest pixel) has a value greater than 1. That is, if the brightest pixel in the image is brighter than the maximum allowed range, the exposure and highlights settings will be modified as follows:

$$exposure=-1.25*exScale*master \quad (27A)$$

$$rawhighlights=1.0/(1.25*whitepoint) \quad (27B)$$

$$highlights=\min(-0.75*NL(master)*whitepoint, 0.75) \quad (27C)$$

Specifically, the exposure setting is calculated using the "exScale" value set by eq. (6B), with the negative sign indicating that exposure is increased for a negative master value. If the whitepoint is not greater than 1, and the master control value is negative, some embodiments use the exScale value calculated by eq. (6B) as the exposure value. The "rawhighlights" value again represents the RAW highlights, and is calculated in the same way irrespective of whether the master control value is positive or negative. The eq. (27C) modifies the highlights value for images with a whitepoint greater than 1, such that the value resulting from this equation is used rather than eq. (26). For these images, the highlights values are based on both the non-linear term derived from the value of the master control and the whitepoint value.

IV. Color Based Master Control

Figure 10:
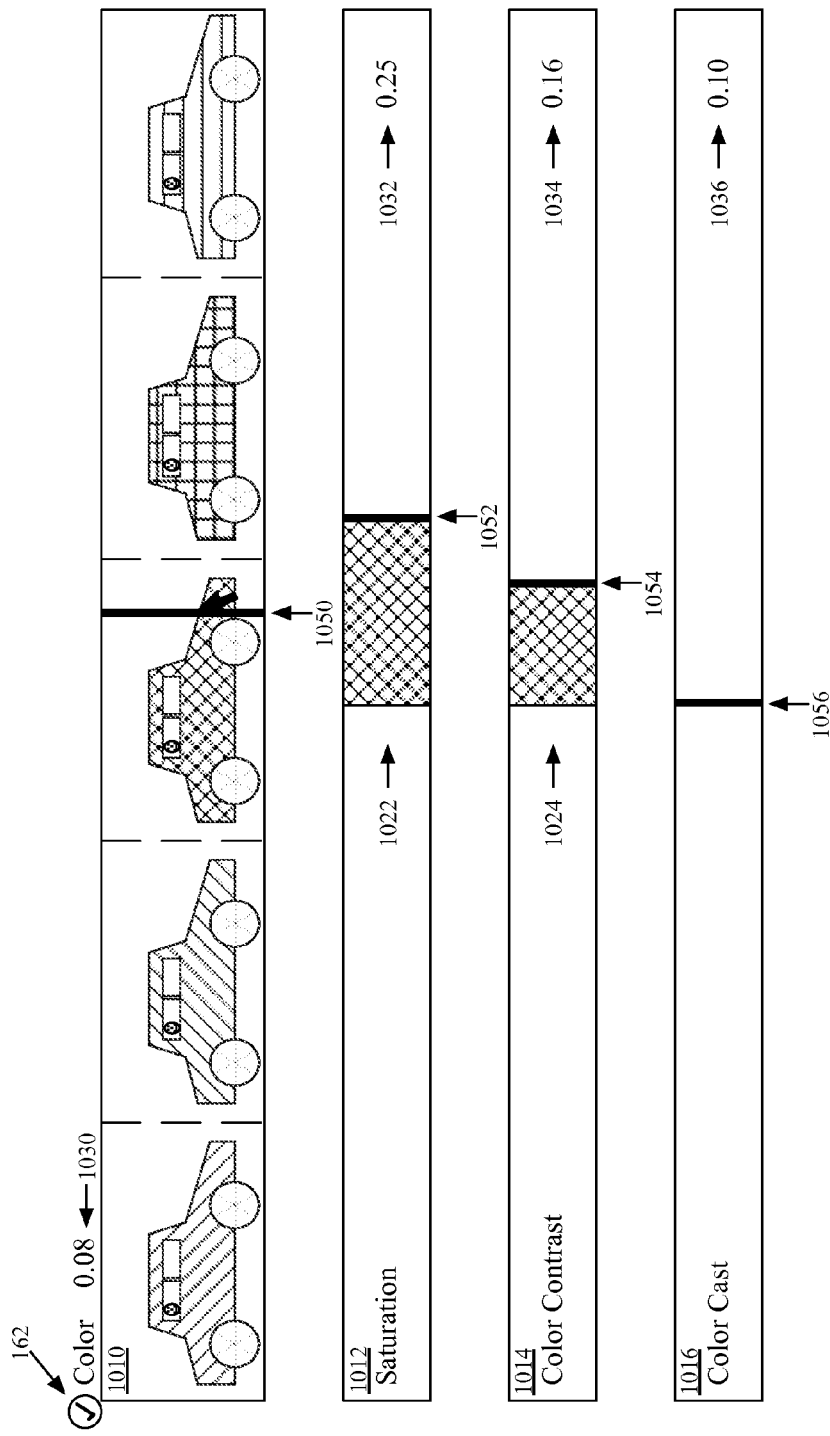
FIG. 10 illustrates a color based master control at a low, positive setting and multiple image editing controls rigged to the master control.

FIG. 10 illustrates a color based master control at a low, positive setting and multiple image editing controls rigged to the master control. The figure includes master control 1010, saturation control 1012, color contrast control 1014, color cast control 1016, stripes 1022 and 1024, master control value indicator 1030, saturation indicator 1032, color contrast indicator 1034, color cast indicator 1036, and control knobs 1050-1056.

In this figure, master control 1010 includes multiple thumbnail images that provide an approximation of what the image being edited will look like under various settings. For example, when the control knob 1050 is set to values on the right side of the master control 1010, the colors of the image will look brighter, so the thumbnail on that side has brighter colors. In contrast, when the control knob 1050 is set to values on the left side of the master control 1010, the colors of the image will look darker, so the thumbnail on that side is darker. In this figure, master control 1010 is set to a positive setting (the control knob 1050 is to the right of the middle). In some embodiments, the center of the master control is a neutral setting, the right side is positive and the left side is negative. In some embodiments, a neutral setting of the master control 1010 would result in a neutral setting of each of the image editing controls 1012-1014 rigged to the master control 1010. In some embodiments, a neutral value of an image editing control results in that control making no changes to an image. As only the color cast control 1016 is set to a neutral value, the image editing application changes the image based on the values of saturation control 1012 and color contrast control 1014, but does not change the image based on the values of color cast control 1016. The values associated with each control 1010-1016 are indicated by the indicators 1030-1036 and control knobs 1050-1056. In addition, the non-zero values associated with controls 1012 and 1014 are indicated by stripes 1022 and 1024, which extend a distance from the center of their respective controls proportionate to the value of the controls. In the figures illustrated herein, the lengths and distances may not be to scale within a given figure or across figures.

The master control 1010 and image editing controls 1012-1022 are all represented as sliders. That is, controls which are adjusted by a user sliding a graphical user interface (GUI) element, such as the control knobs 1050-1062. In some embodiments, the GUI receives commands to slide a control knob by a user clicking and dragging the control knob with a cursor control device. In some embodiments, instead of or in addition to receiving commands from a cursor control device, the GUI receives commands to slide a control knob from a touch (e.g., a finger making contact and dragging the control knob) on a touch sensitive display screen. Similarly, in addition to or instead of such interfaces, some embodiments allow a user to select and move a control knob by using a keyboard (e.g., tabbing to select a particular control knob and using arrow keys to move the selected control knob to increase or decrease the value of the control). Although the illustrated controls are all sliders, in other embodiments, other types of controls are provided for one or more image editing settings. For example, in some embodiments, one or more controls are dials, multi-axis multi-setting interfaces (e.g., a grid with exposure values along one axis and contrast values along another axis, with each point on the grid representing a value for both exposure and contrast settings), a numerical control (e.g., values can be typed into a text entry box), and/or other GUI control mechanisms.

In the embodiments illustrated herein, the controls 1012 and 1014 are rigged to the master control, but the control 1016 is not rigged to the master control. In these embodiments, adjustments to the value of master control 1010 will result in changes the values of controls 1012 and 1014, but no changes to the value of control 1016. In some embodiments, activating the master control expander 162 will reveal (or hide) controls 1012 and 1014, which are rigged to master control 1010 and control 1016 that is not rigged to the master control 1010. In addition to the stripes 1022-1024 and the control knobs 1052-1056, the indicators 1032-1036 display numbers that indicate the value of the corresponding setting. For example, indicator 1032 displays a number (here, 0.25) that indicates that the saturation setting of saturation control 1012 has a value of 0.25 in this figure. Similarly, indicator 1030 displays a number (here, 0.08) that indicates that the master control setting of master control 1010 has a value of 0.08 in this figure.

Several features of the rigging of values of the image editing settings to the master control are displayed in this figure. The figure illustrates that different image editing controls 1012-1016 can have different relationships with the master control 1010. Here, the relationship between master control 1010 and image editing control 1012 results in the value of the image editing control 1012 being automatically set to 0.25 when the value of the master control 1010 is set to 0.08. In contrast, the relationship between the master control 1010 and image editing control 1014 results in the value of image editing control 1014 being automatically set to 0.16 when the value of the master control 1010 is set to 0.08. The same types of relationships (e.g., positive, negative, non-linear, with a peak or trough for the image editing control in the middle of the master control range, etc.) described with respect to the light based master control are applied to the color master control in some embodiments.

The saturation control 1012 of some embodiments makes a saturation adjustment to the image. In some embodiments, a saturation adjustment for each pixel in an image (i) determines an average color component value of the pixel, (ii) determines a difference between each color component value and that average, (iii) adjusts the pixel color component values to maintain the average while multiplying the differences by a saturation factor determined by the user. In such embodiments, when the saturation factor is 0, the pixel is adjusted such that each color component is set to the average value. When the saturation factor is between 0 and 1, the adjusted color component values of the pixel are closer to the average pixel value than the color component values of the original pixel. The closer the saturation factor is to 0, the more desaturated the adjusted pixel will be. When the saturation factor is greater than 1, the adjusted color component values of the pixel are farther from the average pixel value than the color component values of the original pixel. The larger the saturation factor is, the more color saturated the adjusted pixel will be.

In some embodiments, the saturation control 1012 is a modified saturation adjustment control. In such embodiments, when the user sets a saturation factor greater than 1 (i.e., to increase the saturation of the pixels), the image editing embodiment will dampen the saturation adjustments of pixels based on the original color component values of the pixels. In some embodiments, a dampening factor is calculated based on a distance in a color space (e.g., an RGB color space) of the pixel from a particular point in the RGB color space. In some embodiments, the particular point represents a cyan-type color (e.g., R=0, G=0.35, B=0.25). In some embodiments, the farther from the cyan-type color an original pixel is, the more damped the saturation adjustment will be. In some embodiments, the modified saturation adjustment dampens the saturation adjustment of a pixel by calculating a weighted average of (i) a set of adjusted pixel color component values based on an undamped saturation adjustment of the original pixel and (ii) the original pixel color component values, with the weight of the average based on the dampening factor. For pixels at (in color values) to the particular cyan-type color, the modified saturation values will be the same as the undamped adjusted pixel color component values. For pixels farther (in color values) from the particular cyan-type color, the modified saturation values will be closer to the original pixel color component values.

The color contrast control 1014 of some embodiments is a control designed to specifically affect certain colors. Specifically, the color contrast control is used to make blue skies richer and green grass brighter and/or darker when modified in the positive direction, while not modifying the red values as much (i.e., to avoid changing the skin tones). In some embodiments, a color contrast adjustment for each pixel in the image first determines a difference between the pixel (e.g., the pixel's RGB values) and a particular color value (e.g., a bluish cyan pixel value, such as R=0, G=0.3, B=0.5). The color contrast adjustment then calculates and smoothes the magnitude of this difference, which represents a form of saturation for the pixel. The color contrast adjustment then multiplies the smoothed difference magnitude by the setting of the color contrast control (e.g., as determined by direct user input or by the master control), such that only the more saturated pixels (as defined by the distance from the reference bluish cyan pixel) are modified by the input. The output of this calculation gives a strength value used in the output value for the pixel. The color contrast control also clamps the pixel value so that it is between 0 and 1.

The color contrast control modifies the calculated strength value based on the difference between the pixel's blue value and green value, with a positive multiplier if the pixel is more blue and a negative multiplier if the pixel is more green. The strength value is then used to calculate the resulting pixel value using a fake atan equation that acts like a positive power function when the strength value is greater than 1 and a gain/power function when the strength value is less than 1. The result of this function is that blue pixels are made deeper while green pixels are made richer.

Some embodiments use a different algorithm for the color contrast control when the input value is negative. In this case, the goal is to darken the greens and blues while again avoiding change to the red pixels. First, the negative color contrast adjustment of some embodiments applies a "vibrancy" desaturation, which desaturates the greens and blues but not the reds (i.e., the skin tones). In some embodiments, this desaturation is based on the (always less than 0.0) setting value of the color contrast slider. After the vibrancy desaturation effect, the color contrast adjustment performs an algorithm similar to that for positive values of the slider, which darkens the greens and blues. That is, the algorithm calculates the strength value in the same way based on the "saturation" calculated as a smoothed distance from a bluish cyan pixel value. The resulting pixel value is calculated slightly differently, however, with a standard power function if the image is more green and the fake atan function if the image is more blue. As mentioned above, in some embodiments the modified saturation control 1012 and the color contrast control 1014 are rigged to the master color control 1010. On the other hand, the color cast control 1016 of some embodiments is not affected by the master color control 1010. Instead, the color cast control of some embodiments is only modified by direct user input to the control.

In some embodiments, the color cast control 1016 is a simplified white balance algorithm for adding or removing minor casts from an image. Specifically, this is a single control that goes from neutral towards warm then reds, and from neutral towards cool then greens. Whereas the saturation and color contrast controls described above act on the pixel values of the image in RGB space, the color cast control of some embodiments acts on the pixel values in a luma-chroma (e.g., YIQ) space. Specifically, some embodiments initially calculate piece-wise interpolated chroma modification values, which indicate how to move the image in YIQ space. If the color cast control value is negative, the pixel values of the image will be moved towards warm values, whereas if the color cast control value is positive, the pixel values of the image will be moved towards cool values.

This input is then passed into the modified white balance algorithm, which keeps the Y value (i.e., the luma value) constant and moves the chroma values. In some embodiments, this algorithm converts the RGB pixel values of the image into YIQ space with a power function of 0.25, modifies the IQ values as determined based on the color cast control value (dampened by how light the pixel is such that darker pixels do not move as much as lighter pixels, so that shadows do not move too far), then converts the modified values back into RGB space for output.

Figure 11:
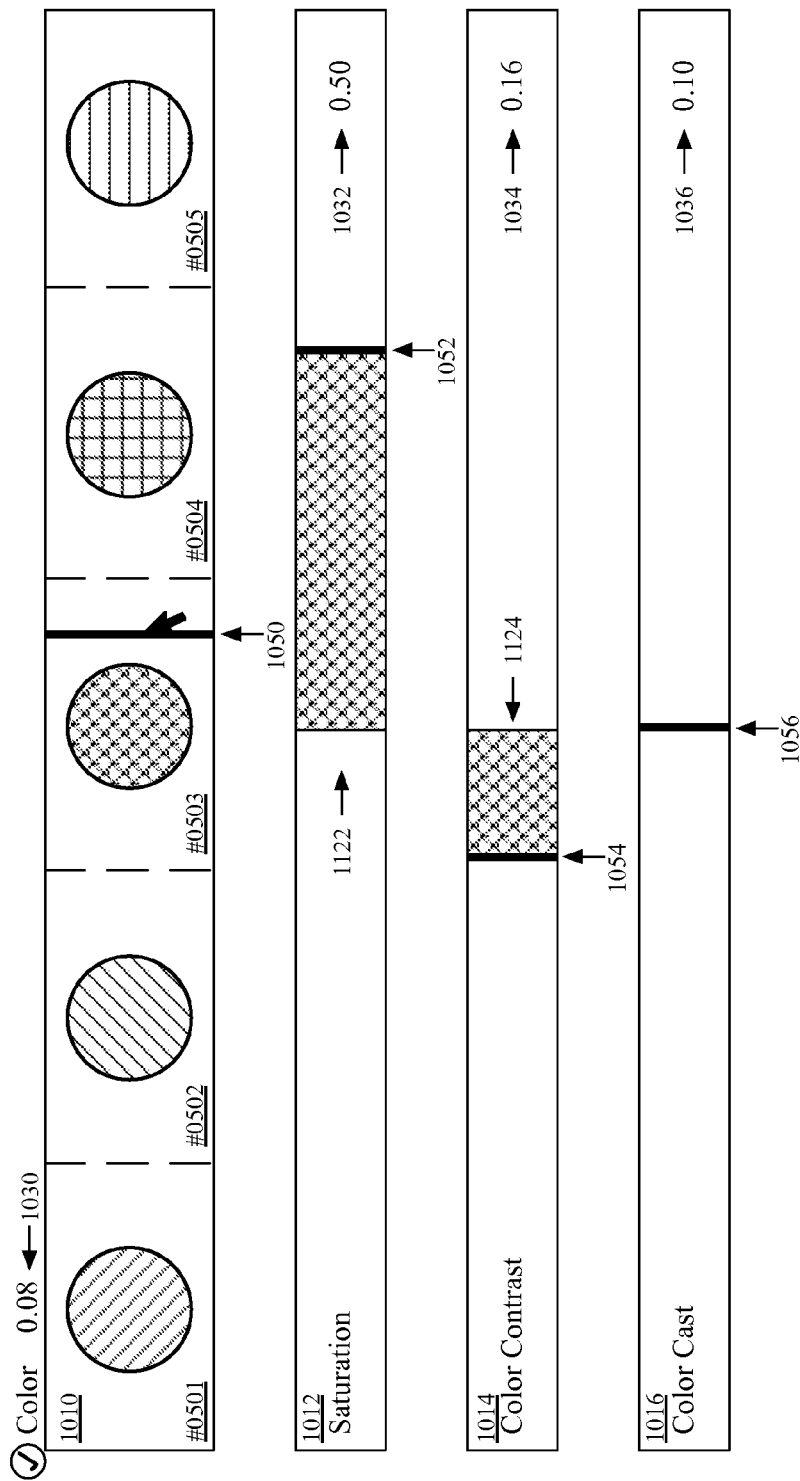
FIG. 11 illustrates a color master control at a low, positive setting and multiple image editing controls rigged to the master control where the rigging is based on an alternate image.

FIG. 11 illustrates a color master control at a low, positive setting and multiple image editing controls rigged to the master control where the rigging is based on an alternate image. The figure includes stripes 1122 and 1124. As previously described with respect to the light based master control of FIGS. 2-7, the relationships between the master control 1010 and the controls 1012 and 1014 are dependent on characteristics of the image. In FIG. 11, the image being edited is represented by thumbnails 501-505. The image being edited in FIG. 11 is different than the image being edited in FIG. 10. Therefore, the relationships between the master control 1010 and image editing controls 1012 and 1014 are different. Accordingly, the values of the image editing controls 1012 and 1014 are different in this figure from the values in FIG. 10, even though the master control 1010 is set to the same value (0.08) in FIG. 10 and FIG. 11. Stripes 1122 and 1124 are a different length than the corresponding stripes 1022 and 1024 in FIG. 10 to indicate the different values of the controls in the different figures.

As mentioned above, some embodiments include an automatic adjustment to the master color control as well as the master light control. As shown in FIG. 8 for the light controls, some embodiments calculate a color histogram (or set of color histograms including a saturation histogram), then calculate statistics and an automatic enhancement for the master color control. For example, some embodiments use the following set of equations to calculate an automatic color adjustment value:

$$\text{distFromEnd} = 1 - p98 \quad (28A)$$

$$\text{distFromEnd} = \text{abs}(0.5 - p75) \quad (28B)$$

$$\text{autoCValue} = \min(0.15 * \text{greenboost}, 1.5 * \text{distFromEnd} * \text{greenboost})) \quad (28C)$$

The value distFromEnd is calculated with either eq. (28A) or eq. (28B) depending on the image. Some embodiments use the second equation when the maximum color in the image is high but the image overall is less saturated. For example, the image-editing application of some embodiments uses the second equation (in which "abs" is the absolute value) when the 98$^{th}$ percentile saturation value "p98" is greater than or equal to 0.99 and the 75$^{th}$ percentile saturation value is less than 0.9. In some such embodiments, the first eq. (28A) is used for other images that do not fit such criteria. In these equations, the variable greenboost is used to saturate the greens more, and is calculated as a function of the green histogram (i.e., a histogram of the green values for the pixels in the image).

V. Individual Light Controls

In addition to the controls described above being linked to their respective master controls (e.g., the master color control and master light control), in some embodiments the user can individually affect these controls as well. The following describes several of the algorithms that govern these individual controls in some embodiments. That is, the following subsections describe how the various individual controls affect the pixel values of an image in some embodiments.

A. Contrast

Many previous contrast algorithms have a tendency to oversaturate colors when applied in RGB color space or desaturate colors when applied only to luminance values. In addition, some contrast algorithms have a tendency to over-reduce either blacks or white, depending on the algorithm. For example, some embodiments use a contrast algorithm s-curve that affects input pixel values (x) to generate output pixel values (y) with the following equations:

$$d = \text{sqrt}(x) * (1 - \text{sqrt}(x)) \quad (29A)$$

$$c = 0.5 * m + (1 + m) * \text{sqrt}(x) \quad (29B)$$

$$y = ((1 - d) * \text{sqrt}(x) + d - c)^2 \quad (29C)$$

In this set of equations, "m" is the contrast setting value based on the movement of the contrast control. This algorithm uses the contrast setting value to linearly interpolate (eq. (29B)) between 0.5 and the sqrt(x). However, if this algorithm were applied to all RGB channels independently (i.e., applying the same formula with each of the red, green, and blue pixel values as the input and output values of the eqs. (29A-C)), the contrast algorithm would oversaturate the image. Similarly, if this equation were applied to only the luminance channel, the algorithm would desaturate the image. Thus, some embodiments apply the set of eqs. (29A-C) to each of the RGB channels as well as the luminance channel, then linearly interpolate between the RGB version and the luminance version based on a predefined value. In different embodiments, this predefined value may be a set value used for all images, based on specifics of the image (e.g., the statistics calculated for the image), or based on the setting of one or more controls.

B. Brightness

Standard image-editing applications use simple power, or gamma, functions to control brightness. Such functions have the benefit of not changing the blackpoint or whitepoint, while easily lightening or darkening an image. However, such standard algorithms will often result in orange skin tones when darkening an image to, e.g., remove overexposure.

Thus, some image-editing applications use a luminance-based approach to darkening the image by applying the gamma function to the luminance channel itself, and then multiplying the image by that gamma scale value. Specifically, such applications calculate the luminance of the pixel (e.g., as a dot product of the RGB vector by an array of constants), apply the gamma function to the luminance channel itself to generate a scale value, then multiply the RGB values by the scale value to get the new RGB values.

For optimal darkening, however, some embodiments use a combination of these two approaches (standard RGB gamma functions and the luminance-based approach). For example, some embodiments use the luminance approach for 80% of the new pixel value and the RGB approach for 20% of the new pixel value. That is, the input brightness value is used to generate a luminance-based output pixel value and a RGB-based output pixel value, which are weighted by 0.8 and 0.2 respectively to generate the output pixel value of the brightness algorithm.

Because the brightness control generates values between −1 and 1, and negative values should darken the image, some embodiments scale the brightness slider by setting the input brightness value to be (1-slider), where "slider" is the value between −1 and 1.

The above describes the affect of the brightness control when the user moves the control in the negative direction (i.e., to the left), either by direct input or through the master light control. For movements of the control to the right (to increase the brightness of an image), typical algorithms apply a power function between 0 and 1. While doing so does increase the brightness of the image, such a function has an infinite slope at 0 and tends to increase dark colors significantly more than light colors, resulting in a flattened image. This requires the user to then either decrease exposure or increase contrast (or both) after applying the brightness control. While some embodiments account for this affect via the master control, some embodiments simply use a different brightness algorithm that does not flatten the image.

Specifically, for an input brightness value of p, some embodiments use the following equation:

$$y=1-((m^{(p+1)})+a^*((p^*m^*(1-m^*m))/(p+1)^*(p+1) \quad (30)$$

In this eq. (30), m is defined as 1–the pixel value (e.g., the R, G, or B value, and "a" is a constant that defines the degree of variance from the standard gamma function at lighter pixel values. Some embodiments use a value between 0.75 and 1 for "a", such as 0.85. This equation results in a more shallow function at the darker values and a more "bulbous" (i.e., starting above the gamma function but more quickly flattening) function at the lighter values.

C. Highlight-Contrast

Some embodiments treat highlights differently for compressed (e.g., JPEG) images versus uncompressed (e.g., RAW) images. Specifically, because many compressed image formats do not include information above the 0-1 range, simply bringing the brighter portions of the image down results in murky gray highlights. Thus, some embodiments use a highlight algorithm for compressed images that brings the brighter pixels down but then also applies a contrast to these brighter pixels.

In some embodiments, the highlight-contrast algorithm first calculates a value based on the highlight control value "h" (which ranges from −1 to 1) using the following set of equations:

$$highAmt=1.45-0.45^*exp(-h^*h/0.75), \text{ if } h>0 \quad (31A)$$

$$highAmt=0.55-0.45^*exp(-h^*h/0.75), \text{ if } h<=0 \quad (31B)$$

These eqs. (31A-B) give a value of 1 when the highlight control is not moved, which in turn causes the highlight-contrast algorithm to not affect the image at all. Using this "highAmt" input value, the image-editing application of some embodiments applies a standard gamma (power) function as such:

$$rgbOutput=x^{(3.0-highAmt^*2.0)} \quad (32)$$

In this eq. (32), x is the input pixel value (e.g., the R, G, or B value) of a pixel, and rgbOutput is the resultant value. Thus, using eq. (32), as the highAmt becomes negative, the RGB value (a number less than 1) is raised to a higher power, and therefore the pixel values become darker. However, to prevent skin-tones (which may be in the highlights) from turning orange, some embodiments also operate in the luminance channel.

Thus, some embodiments perform a similar contrast operation to the above eq. (32) for the luminance channel (calculated, e.g., based on the RGB values), then linearly interpolate based on a pivot value (e.g., 0.8). This has the effect of performing a contrast spread about the pivot value, which is in the upper (highlight) range of pixel values. The contrast spread pushes values away from the pivot, such that values above the pivot go up and values below the pivot go downwards.

Essentially, some embodiments use more of the luminance contrast until the user moves the highlights control to a certain threshold in order to prevent skin-tones from looking orange. However, once the user passes this threshold (i.e., moves the highlights control a large distance), the image-editing application allows more of the RGB contrast in order to give vibrant colors at the highlights (e.g., for sunsets and similar imagery).

VI. Mobile Device

Figure 12:
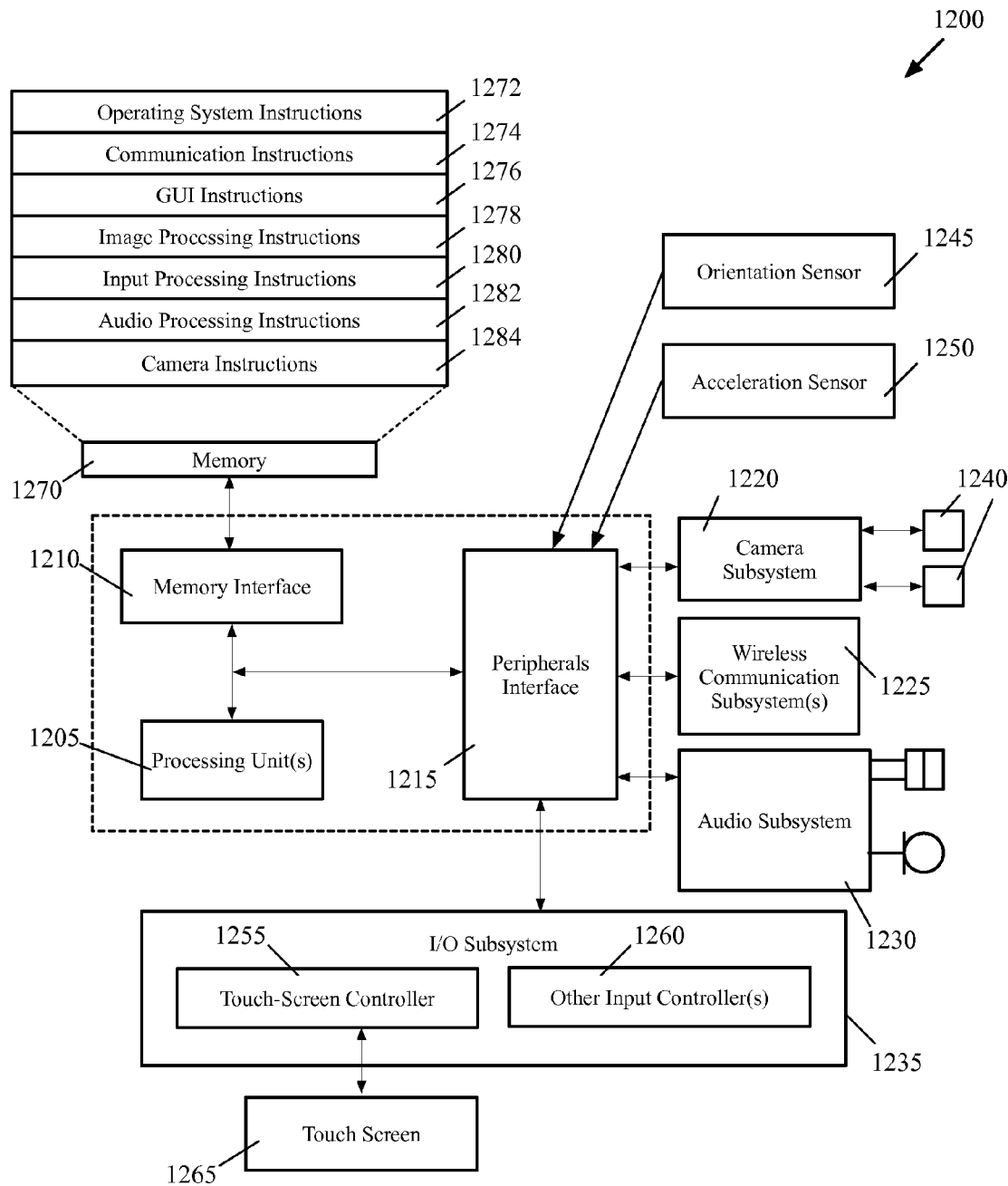
FIG. 12 is an example of an architecture of a mobile computing device.

The image organizing, editing, and viewing applications of some embodiments operate on mobile devices, such as smartphones (e.g., iPhones®) and tablets (e.g., iPads®). FIG. 12 is an example of an architecture 1200 of such a mobile computing device. Examples of mobile computing devices include smartphones, tablets, laptops, etc. As shown, the mobile computing device 1200 includes one or more processing units 1205, a memory interface 1210 and a peripherals interface 1215.

The peripherals interface 1215 is coupled to various sensors and subsystems, including a camera subsystem 1220, a wireless communication subsystem(s) 1225, an audio subsystem 1230, an I/O subsystem 1235, etc. The peripherals interface 1215 enables communication between the processing units 1205 and various peripherals. For example, an orientation sensor 1245 (e.g., a gyroscope) and an acceleration sensor 1250 (e.g., an accelerometer) is coupled to the peripherals interface 1215 to facilitate orientation and acceleration functions.

The camera subsystem 1220 is coupled to one or more optical sensors 1240 (e.g., a charged coupled device (CCD) optical sensor, a complementary metal-oxide-semiconductor (CMOS) optical sensor, etc.). The camera subsystem 1220 coupled with the optical sensors 1240 facilitates camera functions, such as image and/or video data capturing. The wireless communication subsystem 1225 serves to facilitate communication functions. In some embodiments, the wireless communication subsystem 1225 includes radio frequency receivers and transmitters, and optical receivers and transmitters (not shown in FIG. 12). These receivers and transmitters of some embodiments are implemented to operate over one or more communication networks such as a GSM network, a Wi-Fi network, a Bluetooth network, etc. The audio subsystem 1230 is coupled to a speaker to output audio (e.g., to output voice navigation instructions). Additionally, the audio subsystem 1230 is coupled to a microphone to facilitate voice-enabled functions, such as voice recognition (e.g., for searching), digital recording, etc.

The I/O subsystem 1235 involves the transfer between input/output peripheral devices, such as a display, a touch screen, etc., and the data bus of the processing units 1205 through the peripherals interface 1215. The I/O subsystem 1235 includes a touch-screen controller 1255 and other input controllers 1260 to facilitate the transfer between input/output peripheral devices and the data bus of the processing units 1205. As shown, the touch-screen controller 1255 is coupled to a touch screen 1265. The touch-screen controller 1255 detects contact and movement on the touch screen 1265 using any of multiple touch sensitivity technologies. The other input controllers 1260 are coupled to other input/control devices, such as one or more buttons. Some embodiments include a near-touch sensitive screen and a corresponding controller that can detect near-touch interactions instead of or in addition to touch interactions.

The memory interface 1210 is coupled to memory 1270. In some embodiments, the memory 1270 includes volatile memory (e.g., high-speed random access memory), non-volatile memory (e.g., flash memory), a combination of volatile and non-volatile memory, and/or any other type of memory. As illustrated in FIG. 12, the memory 1270 stores an operating system (OS) 1272. The OS 1272 includes instructions for handling basic system services and for performing hardware dependent tasks.

The memory 1270 also includes communication instructions 1274 to facilitate communicating with one or more additional devices; graphical user interface instructions 1276 to facilitate graphic user interface processing; image processing instructions 1278 to facilitate image-related processing and functions; input processing instructions 1280 to facilitate input-related (e.g., touch input) processes and functions; audio processing instructions 1282 to facilitate audio-related processes and functions; and camera instructions 1284 to facilitate camera-related processes and functions. The instructions described above are merely exemplary and the memory 1270 includes additional and/or other instructions in some embodiments. For instance, the memory for a smartphone may include phone instructions to facilitate phone-related processes and functions. Additionally, the memory may include instructions for an image organizing, editing, and viewing application. The above-identified instructions need not be implemented as separate software programs or modules. Various functions of the mobile computing device can be implemented in hardware and/or in software, including in one or more signal processing and/or application specific integrated circuits.

While the components illustrated in FIG. 12 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 12 may be split into two or more integrated circuits.

VI. Computer System

Figure 13:
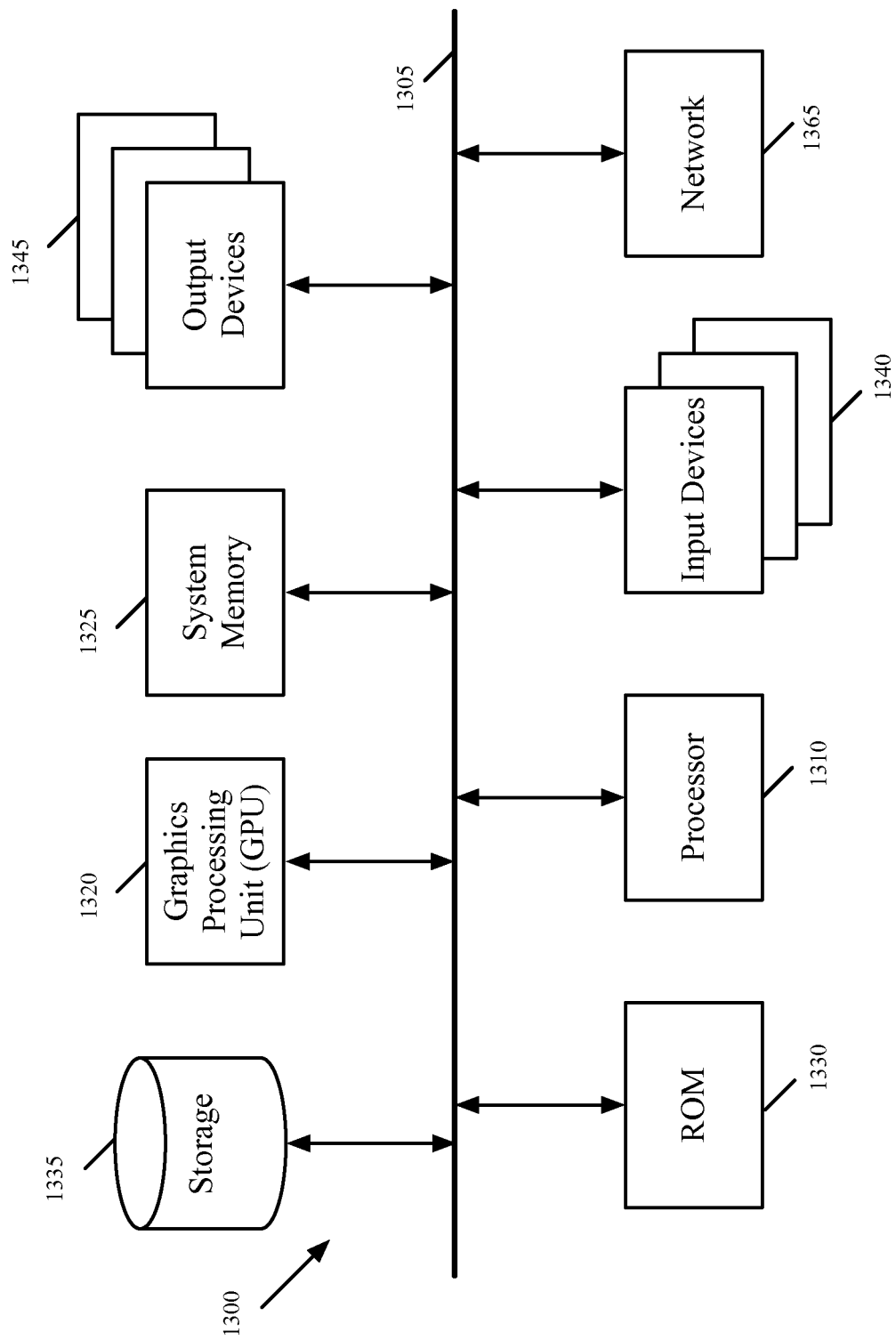
FIG. 13 conceptually illustrates another example of an electronic system with which some embodiments of the invention are implemented.

FIG. 13 conceptually illustrates another example of an electronic system 1300 with which some embodiments of the invention are implemented. The electronic system 1300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1300 includes a bus 1305, processing unit(s) 1310, a graphics processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the GPU 1315, the system memory 1320, and the permanent storage device 1335.

From these various memory units, the processing unit(s) 1310 retrieves instructions to execute and data to process in order to execute the processes of the invention. The processing unit(s) may be a single processor or a multi-core processor in different embodiments. Some instructions are passed to and executed by the GPU 1315. The GPU 1315 can offload various computations or complement the image processing provided by the processing unit(s) 1310.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor needs at runtime. In some embodiments, the invention's processes are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While various processes described herein are shown with operations in a particular order, one of ordinary skill in the art will understand that in some embodiments the orders of operations will be different. For example in the process 900 of FIG. 9, the calculation of the statistics is shown as taking place before receiving the master control value from the user, but in other embodiments, the order may be different, or the operations may even run in parallel.

While various operations are described herein as taking place in specific color spaces (e.g., RGB color space, YUV color space, etc.) one of ordinary skill in the art will understand that comparable operations can be performed in other color spaces in some embodiments. For example, the application of some embodiments perform color adjustments in a YUV color space or a $YC_bC_r$ color space instead of a YIQ color space.

As used herein, notation including the lower case letter "p" coupled with a number represents that number's percentile of a particular type of values (e.g., gray values, green values, saturation values, etc.). All specific percentile values are examples used in some embodiments, however, other embodiments use other percentiles. Furthermore, for many of the features described herein, specific equations are shown (e.g., describing the relationships between the master controls and the individual controls, describing the effects of the individual controls on the pixels of an image, etc.). One of ordinary skill in the art will recognize that different embodiments may use different equations for these relationships.

What is claimed is:

1. A non-transitory machine readable medium storing an image-editing application executable by at least one processor, the image-editing application comprising sets of instructions for:

identifying a set of characteristics of an image;

for each of a plurality of image editing controls, defining a relationship, derived from at least one of the identified characteristics of the image, between a set of values of a master control and a set of values of the image editing control;

based on input received to modify the set of values of the master control and the relationships between the master control and the plurality of image editing controls derived from the set of characteristics of the image, modifying the sets of values of the plurality of image editing controls; and applying edits to the image based on the modified sets of values of the plurality of image editing controls.

2. The non-transitory machine readable medium of claim 1, wherein the set of instructions for defining the relationship comprises sets of instructions for:

assigning a first value for a particular image editing control to correspond to a particular value of the master control when a first image is being edited; and assigning a second value for the particular image editing control to correspond to the particular value of the master control when a second image is being edited.

3. The non-transitory machine readable medium of claim 2, wherein the particular image editing control comprises a contrast control.

4. The non-transitory machine readable medium of claim 3, wherein the relationship between the set of values of the master control and a first set of values of the contrast control for the first image is derived from a contrast characteristic of the first image, wherein the relationship between the set of values of the master control and a second set of values of the contrast control for the second image is derived from a contrast characteristic of the second image.

5. The non-transitory machine readable medium of claim 2, wherein the particular image editing control is a contrast control, the image-editing application further comprising a set of instructions for setting the first value to be higher than the second value when an initial contrast characteristic of the first image is lower than an initial contrast characteristic of the second image.

6. The non-transitory machine readable medium of claim 2, wherein the particular image editing control is a shadow control.

7. The non-transitory machine readable medium of claim 6, wherein the image-editing application further comprises a set of instructions for setting the first value to be lower than the second value when an initial brightness characteristic of the first image is higher than an initial brightness characteristic of the second image.

8. The non-transitory machine readable medium of claim 1, wherein the set of instructions for defining the relationship comprises sets of instructions for:

assigning a first value for a particular image editing control to correspond to a low value of the master control;

assigning a second value for the particular image editing control to correspond to a middle value of the master control; and assigning a third value for the particular image editing control to correspond to a high value of the master control, wherein the second value is higher than the first value and the second value is higher than the third value.

9. For an image editing application, a method comprising:

identifying a set of characteristics of an image;

for each of a plurality of image editing controls, defining a relationship, derived from at least one of the identified characteristics of the image, between a set of values of a master control and a set of values of the image editing control;

based on input received to modify the set of values of the master control and the relationships between the master control and the plurality of image editing controls derived from the set of characteristics of the image, modifying the sets of values of the plurality of image editing controls; and applying edits to the image based on the modified sets of values of the plurality of image editing controls.

10. The method of claim 9, wherein the image is a first image, wherein defining the relationship comprises assigning a first value for a particular image editing control to correspond to a particular value of the master control when the first image is being edited, wherein the method further comprises assigning a second value for the particular image editing control to correspond to the particular value of the master control when a second image is being edited.

11. The method of claim 10, wherein the particular image editing control comprises a contrast control.

12. The method of claim 11, wherein the relationship between the set of values of the master control and a first set of values of the contrast control for the first image depends on a contrast characteristic of the first image and the relationship between the set of values of the master control and a second set of values of the contrast control for the second image depends on a contrast characteristic of the second image.

13. The method of claim 11 further comprising setting the first value to be higher than the second value when an initial contrast characteristic of the first image is lower than an initial contrast characteristic of the second image.

14. The method of claim 10, wherein the particular image editing control is a shadow control.

15. The method of claim 14 further comprising setting the first value to be lower than the second value when an initial brightness characteristic of the first image is higher than an initial brightness characteristic of the second image.

16. The method of claim 9, wherein defining the relationship for a particular image editing control comprises:
    assigning a first value for the particular image editing control to correspond to a low value of the master control;
    assigning a second value for the particular image editing control to correspond to a middle value of the master control; and
    assigning a third value for the particular image editing control to correspond to a high value of the master control, wherein the second value is lower than the first value and the second value is lower than the third value.

17. A non-transitory machine readable medium storing an image-editing application executable by at least one processor, the image-editing application comprising sets of instructions for:

displaying a master control for adjusting a plurality of image editing controls of the image editing application to edit an image;

defining a mathematical relationship between values of the master control and values of each control of the plurality of image editing controls, wherein each mathematical relationship is derived from at least one characteristic of the image;

based on input received to modify the values of the master control and the defined mathematical relationship between the values of the master control and the values of each of the image editing controls derived from the image characteristics, modifying values of the plurality of image editing controls; and applying edits to the image based on the modified values of the plurality of image editing controls.

18. The non-transitory machine readable medium of claim 17, wherein the set of instructions for modifying values of the image editing controls comprises sets of instructions for:
    receiving a master control value; and
    automatically adjusting a value for each of the plurality of image editing controls based on the master control value and the mathematical relationship between the master control value and the values for each of the image editing controls.

19. The non-transitory machine readable medium of claim 18, wherein at least one of the mathematical relationships is a non-linear relationship.

20. The non-transitory machine readable medium of claim 18, wherein the image-editing application further comprises sets of instructions for:
    receiving a command to independently adjust a particular one of the plurality of image-editing controls without adjusting the master control; and
    adjusting the particular image-editing control without adjusting the master control value.

21. The non-transitory machine readable medium of claim 20, wherein the image-editing application further comprises a set of instructions for preventing the value of the particular independently adjusted image-editing control from changing in response to subsequent changes in the master control value.

22. The non-transitory machine readable medium of claim 17, wherein at least one of the image-editing controls has a first mathematical relationship with master control values above a threshold and a second mathematical relationship with master control values below the threshold.

* * * * *